(12) United States Patent
Bao et al.

(10) Patent No.: US 12,114,252 B2
(45) Date of Patent: Oct. 8, 2024

(54) POSITIONING REFERENCE SIGNAL ADJUSTMENT BASED ON REPETITIVE SIGNAL PERFORMANCE

(71) Applicant: Qualcomm Incorporated, San Diego, CA (US)

(72) Inventors: Jingchao Bao, San Diego, CA (US); Sony Akkarakaran, San Diego, CA (US); Tao Luo, San Diego, CA (US); Juan Montojo, San Diego, CA (US); Alexandros Manolakos, Escondido, CA (US)

(73) Assignee: QUALCOMM Incorporated, San Diego, CA (US)

( * ) Notice: Subject to any disclaimer, the term of this patent is extended or adjusted under 35 U.S.C. 154(b) by 177 days.

(21) Appl. No.: 17/399,591

(22) Filed: Aug. 11, 2021

(65) Prior Publication Data
US 2022/0053411 A1   Feb. 17, 2022

Related U.S. Application Data

(60) Provisional application No. 63/065,792, filed on Aug. 14, 2020.

(51) Int. Cl.
*H04W 48/12* (2009.01)
*H04L 5/00* (2006.01)
*H04W 48/04* (2009.01)
*H04W 64/00* (2009.01)

(52) U.S. Cl.
CPC .......... *H04W 48/12* (2013.01); *H04L 5/0048* (2013.01); *H04W 48/04* (2013.01); *H04W 64/003* (2013.01)

(58) Field of Classification Search
CPC ... H04W 48/12; H04W 48/04; H04W 64/003; H04W 24/02; H04W 24/10; H04W 64/00; H04W 76/28; H04L 5/0048; H04L 5/0078; H04L 27/261; H04L 5/006; H04L 5/0091; H04L 5/0026; G01S 5/0236; G01S 5/0215; G01S 5/0218; G01S 2201/01; G01S 1/68; G01S 1/0428; G01S 1/045; G01S 5/0036
See application file for complete search history.

(56) References Cited

U.S. PATENT DOCUMENTS

2019/0068315 A1\* 2/2019 Rydén ................. H04B 7/0602
2019/0373564 A1  12/2019 Henriksson et al.

OTHER PUBLICATIONS

International Search Report and Written Opinion—PCT/US2021/045647—ISA/EPO—Nov. 26, 2021.

(Continued)

*Primary Examiner* — Justin T Van Roie
(74) *Attorney, Agent, or Firm* — SUNSTEIN LLP/Qualcomm

(57) ABSTRACT

A method, at an apparatus, of adapting to repetitive positioning reference signal reception degradation, includes: obtaining positioning reference signal pattern information, indicative of repetitive degradation of reception quality of a positioning reference signal; and transmitting, based on the positioning reference signal pattern information, at least one of: one or more positioning-reference-signal-related configuration parameters to a network entity; or a signal in accordance with the one or more positioning-reference-signal-related configuration parameters to a user equipment.

48 Claims, 11 Drawing Sheets

(56) References Cited

OTHER PUBLICATIONS

Qualcomm Incorporated: "Potential Enhancements for NR Rel-17 Positioning", 3GPP TSG RAN WG1 #102-e, 3GPP Draft, R1-2006810, 3rd Generation Partnership Project (3GPP), Mobile Competence Centre, 650, Route Des Lucioles, F-06921 Sophia-Antipolis Cedex, France, vol. RAN WG1, No. e-Meeting, Aug. 17, 2020-Aug. 28, 2020, Aug. 8, 2020 (Aug. 8, 2020), pp. 1-21, XP051918260, Retrieved from the Internet: URL: https://ftp.3gpp.org/tsg_ran/WG1_RL1/TSGR1_102-e/Docs/R1-2006810.zip, R1-2006810.docx [retrieved on Aug. 8, 2020], Proposal 11, paragraph [03.3] paragraph [4.2.2].

* cited by examiner

POSITIONING REFERENCE SIGNAL ADJUSTMENT BASED ON REPETITIVE SIGNAL PERFORMANCE

CROSS-REFERENCE TO RELATED APPLICATIONS

This application claims the benefit of U.S. Provisional Application No. 63/065,792, filed Aug. 14, 2020, entitled "POSITIONING REFERENCE SIGNAL ADJUSTMENT BASED ON REPETITIVE SIGNAL PERFORMANCE," assigned to the assignee hereof, and the entire contents of which are hereby incorporated herein by reference.

BACKGROUND

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service, a fourth-generation (4G) service (e.g., Long Term Evolution (LTE) or WiMax), a fifth-generation (5G) service, etc. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Orthogonal Frequency Division Multiple Access (OFDMA), Time Division Multiple Access (TDMA), the Global System for Mobile access (GSM) variation of TDMA, etc.

A fifth generation (5G) mobile standard calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard.

Furthermore, signaling efficiencies should be enhanced and latency should be substantially reduced compared to current standards.

SUMMARY

An example apparatus includes: an interface configured to exchange wireless signals between the apparatus and a user equipment; a memory; and a processor, communicatively coupled to the interface and the memory, configured to: obtain positioning reference signal pattern information, indicative of repetitive degradation of reception quality of a positioning reference signal; and transmit, via the interface and based on the positioning reference signal pattern information, at least one of: one or more positioning-reference-signal-related configuration parameters to a network entity; or a signal in accordance with the one or more positioning-reference-signal-related configuration parameters to the user equipment. Implementations of such an apparatus may include one or more of the following features. The processor is configured to determine a positioning reference signal muting pattern based on the positioning reference signal pattern information and to transmit an indication of the positioning reference signal muting pattern via the interface to the user equipment. The indication of the positioning reference signal muting pattern indicates one or more positioning reference signals to be repetitively muted. The processor is configured to transmit a deactivation message via the interface to the user equipment indicating a deactivation of the positioning reference signal muting pattern. The deactivation message includes an indication of at least one positioning reference signal measurement for the user equipment to report to the apparatus. The processor is configured to transmit, to the user equipment, at least one of an aperiodic, on-demand, or semi-persistent positioning reference signal independently of the positioning reference signal muting pattern. The indication of the positioning reference signal muting pattern includes a binary bit sequence where each bit in the binary bit sequence indicates a relative degradation and corresponds to a respective amount of time of scheduled positioning reference signal transmission.

Also or alternatively, implementations of such an apparatus may include one or more of the following features. The processor is configured to: predict signal degradation of a particular positioning reference signal scheduled to be transmitted without muting; and in response to predicting the signal degradation of the particular positioning reference signal, at least one of: mute the particular positioning reference signal; or avoid measurement of the particular positioning reference signal. The one or more scheduled positioning-reference-signal-related configuration parameters include at least one of a positioning reference signal periodicity, offset, comb size, muting pattern, or repetition factor.

Another example apparatus includes: means for obtaining positioning reference signal pattern information, indicative of repetitive degradation of reception quality of a positioning reference signal; and means for transmitting, based on the positioning reference signal pattern information, at least one of: one or more positioning-reference-signal-related configuration parameters to a network entity; or a signal in accordance with the one or more positioning-reference-signal-related configuration parameters to a user equipment. Implementations of such an apparatus may include one or more of the following features. The apparatus includes: means for determining a positioning reference signal muting pattern based on the positioning reference signal pattern information; and means for transmitting an indication of the positioning reference signal muting pattern to the user equipment. The indication of the positioning reference signal muting pattern indicates one or more positioning reference signals to be repetitively muted. The apparatus includes means for transmitting a deactivation message to the user equipment indicating a deactivation of the positioning reference signal muting pattern. The deactivation message includes an indication of at least one positioning reference signal measurement for the user equipment to report to the apparatus. The apparatus includes means for transmitting, to the user equipment, at least one of an aperiodic, on-demand, or semi-persistent positioning reference signal independently of the positioning reference signal muting pattern. The indication of the positioning reference signal muting pattern includes a binary bit sequence where each bit in the binary bit sequence indicates a relative degradation and corresponds to a respective amount of time of scheduled positioning reference signal transmission.

Also or alternatively, implementations of such an apparatus may include one or more of the following features. The apparatus includes: predicting means, the predicting means for predicting signal degradation of a particular positioning reference signal scheduled to be transmitted without muting; and means for responding to the predicting means predicting the signal degradation of the particular positioning reference signal by at least one of: muting the particular positioning reference signal; or avoiding measurement of the particular positioning reference signal. The one or more scheduled positioning-reference-signal-related configuration parameters include at least one of a positioning reference signal periodicity, offset, comb size, or repetition factor.

An example method, at an apparatus, of adapting to repetitive positioning reference signal reception degradation, includes: obtaining positioning reference signal pattern information, indicative of repetitive degradation of reception quality of a positioning reference signal; and transmitting, based on the positioning reference signal pattern information, at least one of: one or more positioning-reference-signal-related configuration parameters to a network entity; or a signal in accordance with the one or more positioning-reference-signal-related configuration parameters to a user equipment.

Implementations of such a method may include one or more of the following features. The method includes: determining a positioning reference signal muting pattern based on the positioning reference signal pattern information; and transmitting an indication of the positioning reference signal muting pattern to the user equipment. The indication of the positioning reference signal muting pattern indicates one or more positioning reference signals to be repetitively muted. The method includes transmitting a deactivation message to the user equipment indicating a deactivation of the positioning reference signal muting pattern. The deactivation message includes an indication of at least one positioning reference signal measurement for the user equipment to report to the apparatus. The method includes transmitting, to the user equipment, at least one of an aperiodic, on-demand, or semi-persistent positioning reference signal independently of the positioning reference signal muting pattern. The indication of the positioning reference signal muting pattern includes a binary bit sequence where each bit in the binary bit sequence indicates a relative degradation and corresponds to a respective amount of time of scheduled positioning reference signal transmission.

Also or alternatively, implementations of such a method may include one or more of the following features. The method includes: predicting signal degradation of a particular positioning reference signal scheduled to be transmitted without muting; and responding to predicting the signal degradation of the particular positioning reference signal by at least one of: muting the particular positioning reference signal; or avoiding measurement of the particular positioning reference signal. The one or more scheduled positioning-reference-signal-related configuration parameters include at least one of a positioning reference signal periodicity, offset, comb size, or repetition factor.

An example non-transitory, processor-readable storage medium includes processor-readable instructions configured to cause a processor of an apparatus, in order to adapt to repetitive positioning reference signal reception degradation, to: obtain positioning reference signal pattern information, indicative of repetitive degradation of reception quality of a positioning reference signal; and transmit, based on the positioning reference signal pattern information, at least one of: one or more positioning-reference-signal-related configuration parameters to a network entity; or a signal in accordance with the one or more positioning-reference-signal-related configuration parameters to a user equipment.

Implementations of such a storage medium may include one or more of the following features. The storage medium includes instructions configured to cause the processor to: determine a positioning reference signal muting pattern based on the positioning reference signal pattern information; and transmit an indication of the positioning reference signal muting pattern to the user equipment. The indication of the positioning reference signal muting pattern indicates one or more positioning reference signals to be repetitively muted. The storage medium includes instructions configured to cause the processor to transmit a deactivation message to the user equipment indicating a deactivation of the positioning reference signal muting pattern. The deactivation message includes an indication of at least one positioning reference signal measurement for the user equipment to report to the apparatus. The storage medium includes instructions configured to cause the processor to transmit, to the user equipment, at least one of an aperiodic, on-demand, or semi-persistent positioning reference signal independently of the positioning reference signal muting pattern. The indication of the positioning reference signal muting pattern includes a binary bit sequence where each bit in the binary bit sequence indicates a relative degradation and corresponds to a respective amount of time of scheduled positioning reference signal transmission.

Also or alternatively, implementations of such a storage medium may include one or more of the following features. The storage medium includes instructions configured to cause the processor to: predict signal degradation of a particular positioning reference signal scheduled to be transmitted without muting; and respond to predicting the signal degradation of the particular positioning reference signal by at least one of: muting the particular positioning reference signal; or avoiding measurement of the particular positioning reference signal. The one or more scheduled positioning-reference-signal-related configuration parameters include at least one of a positioning reference signal periodicity, offset, comb size, or repetition factor.

An example user equipment includes: a transceiver configured to transmit and receive wireless signals; a memory; and a processor, communicatively coupled to the transceiver and the memory, and configured to: measure positioning reference signals received via the transceiver; determine a signal degradation pattern corresponding to repetitive signal degradation of the positioning reference signals; and transmit, via the transceiver, an indication of the signal degradation pattern.

Implementations of such a user equipment may include one or more of the following features. The indication of the signal degradation pattern includes one or more positioning reference signal timing parameters. The indication of the signal degradation pattern includes a binary bit sequence where each bit in the binary bit sequence indicates a relative degradation and corresponds to a respective amount of time of scheduled positioning reference signal transmission.

Another example user equipment includes: means for measuring positioning reference signals from a positioning reference signal source; means for determining a signal degradation pattern corresponding to repetitive signal degradation of the positioning reference signals; and means for transmitting an indication of the signal degradation pattern to a network entity.

Implementations of such a user equipment may include one or more of the following features. The indication of the signal degradation pattern includes one or more positioning reference signal timing parameters. The indication of the signal degradation pattern includes a binary bit sequence where each bit in the binary bit sequence indicates a relative degradation and corresponds to a respective amount of time of scheduled positioning reference signal transmission.

An example method of providing an indication of signal degradation includes: measuring positioning reference signals from a positioning reference signal source; determining a signal degradation pattern corresponding to repetitive signal degradation of the positioning reference signals; and transmitting an indication of the signal degradation pattern to a network entity.

Implementations of such an apparatus may include one or more of the following features. The indication of the signal degradation pattern includes one or more positioning reference signal timing parameters. The indication of the signal degradation pattern includes a binary bit sequence where each bit in the binary bit sequence indicates a relative degradation and corresponds to a respective amount of time of scheduled positioning reference signal transmission.

An example non-transitory, processor-readable storage medium includes processor-readable instructions configured to cause a processor of a user equipment, in order to provide an indication of signal degradation, to: measure positioning reference signals from a positioning reference signal source; determine a signal degradation pattern corresponding to repetitive signal degradation of the positioning reference signals; and transmit an indication of the signal degradation pattern to a network entity.

Implementations of such a storage medium may include one or more of the following features. The indication of the signal degradation pattern includes one or more positioning reference signal timing parameters. The indication of the signal degradation pattern includes a binary bit sequence where each bit in the binary bit sequence indicates a relative degradation and corresponds to a respective amount of time of scheduled positioning reference signal transmission.

DETAILED DESCRIPTION

Figure 1:
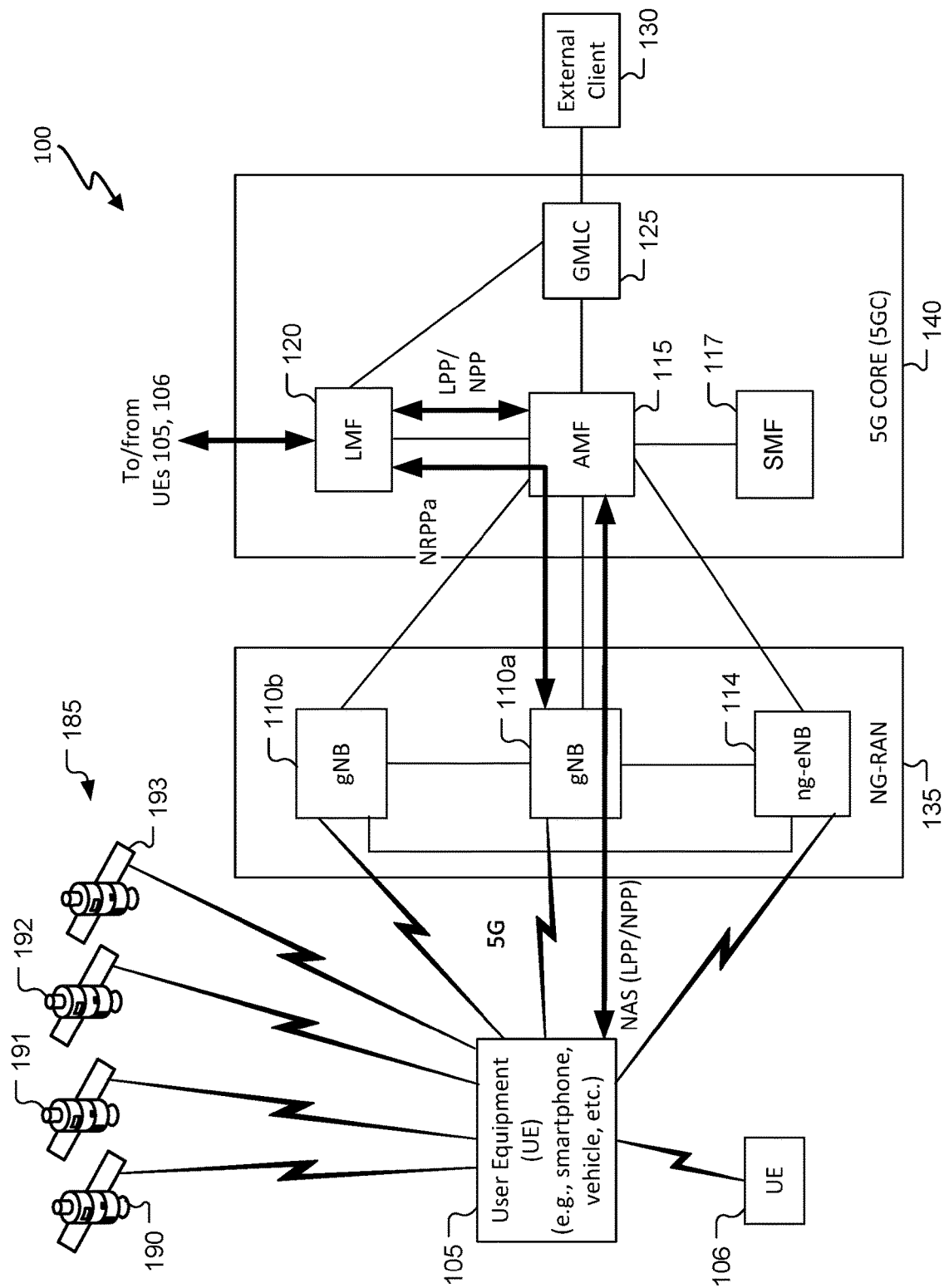
FIG. 1 is a simplified diagram of an example wireless communications system.

Techniques are discussed herein for determining and using repetitive patterns of positioning reference signal reception quality to determine positioning reference signal configuration. For example, a pattern of positioning reference signal (PRS) reception quality associated with (e.g., received by and/or transmitted by) a user equipment may be determined from data over time, such as PRS measurements and/or other measurements and/or other indicators or predictors of PRS reception quality. The pattern may be used to adjust one or more PRS configuration characteristics such as a muting pattern of the PRS. Other examples, however, may be implemented.

Items and/or techniques described herein may provide one or more of the following capabilities, as well as other capabilities not mentioned. Positioning accuracy may be improved, e.g., by avoiding using poor-quality and/or unreliable measurements to determine position. Energy spent measuring poor-reception-quality PRS may be reduced. Position determination accuracy may be improved and latency reduced. Apparatus such as user equipment may perform operations without waiting until the user equipment can properly perform positioning. Other capabilities may be provided and not every implementation according to the disclosure must provide any, let alone all, of the capabilities discussed.

Obtaining the locations of mobile devices that are accessing a wireless network may be useful for many applications including, for example, emergency calls, personal navigation, consumer asset tracking, locating a friend or family member, etc. Existing positioning methods include methods based on measuring radio signals transmitted from a variety of devices or entities including satellite vehicles (SVs) and terrestrial radio sources in a wireless network such as base stations and access points. It is expected that standardization for the 5G wireless networks will include support for various positioning methods, which may utilize reference signals transmitted by base stations in a manner similar to which LTE wireless networks currently utilize Positioning Reference Signals (PRS) and/or Cell-specific Reference Signals (CRS) for position determination.

The description may refer to sequences of actions to be performed, for example, by elements of a computing device. Various actions described herein can be performed by specific circuits (e.g., an application specific integrated circuit (ASIC)), by program instructions being executed by one or more processors, or by a combination of both. Sequences of actions described herein may be embodied within a non-transitory computer-readable medium having stored thereon a corresponding set of computer instructions that upon execution would cause an associated processor to perform the functionality described herein. Thus, the various aspects described herein may be embodied in a number of different forms, all of which are within the scope of the disclosure, including claimed subject matter.

As used herein, the terms "user equipment" (UE) and "base station" are not specific to or otherwise limited to any particular Radio Access Technology (RAT), unless otherwise noted. In general, such UEs may be any wireless communication device (e.g., a mobile phone, router, tablet computer, laptop computer, consumer asset tracking device, Internet of Things (IoT) device, etc.) used by a user to communicate over a wireless communications network. A UE may be mobile or may (e.g., at certain times) be stationary, and may communicate with a Radio Access Network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," a "mobile device," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, WiFi networks (e.g., based on IEEE 802.11, etc.) and so on.

A base station may operate according to one of several RATs in communication with UEs depending on the network in which it is deployed. Examples of a base station include an Access Point (AP), a Network Node, a NodeB, an evolved NodeB (eNB), or a general Node B (gNodeB, gNB). In addition, in some systems a base station may provide purely edge node signaling functions while in other systems it may provide additional control and/or network management functions.

UEs may be embodied by any of a number of types of devices including but not limited to printed circuit (PC) cards, compact flash devices, external or internal modems, wireless or wireline phones, smartphones, tablets, consumer asset tracking devices, asset tags, and so on. A communication link through which UEs can send signals to a RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

As used herein, the term "cell" or "sector" may correspond to one of a plurality of cells of a base station, or to the base station itself, depending on the context. The term "cell" may refer to a logical communication entity used for communication with a base station (for example, over a carrier), and may be associated with an identifier for distinguishing neighboring cells (for example, a physical cell identifier (PCID), a virtual cell identifier (VCID)) operating via the same or a different carrier. In some examples, a carrier may support multiple cells, and different cells may be configured according to different protocol types (for example, machine-type communication (MTC), narrowband Internet-of-Things (NB-IoT), enhanced mobile broadband (eMBB), or others) that may provide access for different types of devices. In some examples, the term "cell" may refer to a portion of a geographic coverage area (for example, a sector) over which the logical entity operates.

Referring to FIG. 1, an example of a communication system 100 includes a UE 105, a UE 106, a Radio Access Network (RAN) 135, here a Fifth Generation (5G) Next Generation (NG) RAN (NG-RAN), and a 5G Core Network (5GC) 140. The UE 105 and/or the UE 106 may be, e.g., an IoT device, a location tracker device, a cellular telephone, a vehicle (e.g., a car, a truck, a bus, a boat, etc.), or other device. A 5G network may also be referred to as a New Radio (NR) network; NG-RAN 135 may be referred to as a 5G RAN or as an NR RAN; and 5GC 140 may be referred to as an NG Core network (NGC). Standardization of an NG-RAN and 5GC is ongoing in the 3rd Generation Partnership Project (3GPP). Accordingly, the NG-RAN 135 and the 5GC 140 may conform to current or future standards for 5G support from 3GPP. The RAN 135 may be another type of RAN, e.g., a 3G RAN, a 4G Long Term Evolution (LTE) RAN, etc. The UE 106 may be configured and coupled similarly to the UE 105 to send and/or receive signals to/from similar other entities in the system 100, but such signaling is not indicated in FIG. 1 for the sake of simplicity of the figure. Similarly, the discussion focuses on the UE 105 for the sake of simplicity. The communication system 100 may utilize information from a constellation 185 of satellite vehicles (SVs) 190, 191, 192, 193 for a Satellite Positioning System (SPS) (e.g., a Global Navigation Satellite System (GNSS)) like the Global Positioning System (GPS), the Global Navigation Satellite System (GLONASS), Galileo, or Beidou or some other local or regional SPS such as the Indian Regional Navigational Satellite System (IRNSS), the European Geostationary Navigation Overlay Service (EGNOS), or the Wide Area Augmentation System (WAAS). Additional components of the communication system 100 are described below. The communication system 100 may include additional or alternative components.

As shown in FIG. 1, the NG-RAN 135 includes NR nodeBs (gNBs) 110a, 110b, and a next generation eNodeB (ng-eNB) 114, and the 5GC 140 includes an Access and Mobility Management Function (AMF) 115, a Session Management Function (SMF) 117, a Location Management Function (LMF) 120, and a Gateway Mobile Location Center (GMLC) 125. The gNBs 110a, 110b and the ng-eNB 114 are communicatively coupled to each other, are each configured to bi-directionally wirelessly communicate with the UE 105, and are each communicatively coupled to, and configured to bi-directionally communicate with, the AMF 115. The gNBs 110a, 110b, and the ng-eNB 114 may be referred to as base stations (BSs). The AMF 115, the SMF 117, the LMF 120, and the GMLC 125 are communicatively coupled to each other, and the GMLC is communicatively coupled to an external client 130. The SMF 117 may serve as an initial contact point of a Service Control Function (SCF) (not shown) to create, control, and delete media sessions. Base stations such as the gNBs 110a, 110b and/or the ng-eNB 114 may be a macro cell (e.g., a high-power cellular base station), or a small cell (e.g., a low-power cellular base station), or an access point (e.g., a short-range base station configured to communicate with short-range technology such as WiFi, WiFi-Direct (WiFi-D), Bluetooth®, Bluetooth®-low energy (BLE), Zigbee, etc. One or more BSs, e.g., one or more of the gNBs 110a, 110b and/or the ng-eNB 114 may be configured to communicate with the UE 105 via multiple carriers. Each of the gNBs 110a, 110b and the ng-eNB 114 may provide communication coverage for a respective geographic region, e.g. a cell. Each cell may be partitioned into multiple sectors as a function of the base station antennas.

FIG. 1 provides a generalized illustration of various components, any or all of which may be utilized as appropriate, and each of which may be duplicated or omitted as necessary. Specifically, although one UE 105 is illustrated, many UEs (e.g., hundreds, thousands, millions, etc.) may be utilized in the communication system 100. Similarly, the communication system 100 may include a larger (or smaller) number of SVs (i.e., more or fewer than the four SVs 190-193 shown), gNBs 110a, 110b, ng-eNBs 114, AMFs 115, external clients 130, and/or other components. The illustrated connections that connect the various components in the communication system 100 include data and signaling connections which may include additional (intermediary)

components, direct or indirect physical and/or wireless connections, and/or additional networks. Furthermore, components may be rearranged, combined, separated, substituted, and/or omitted, depending on desired functionality.

While FIG. 1 illustrates a 5G-based network, similar network implementations and configurations may be used for other communication technologies, such as 3G, Long Term Evolution (LTE), etc. Implementations described herein (be they for 5G technology and/or for one or more other communication technologies and/or protocols) may be used to transmit (or broadcast) directional synchronization signals, receive and measure directional signals at UEs (e.g., the UE 105) and/or provide location assistance to the UE 105 (via the GMLC 125 or other location server) and/or compute a location for the UE 105 at a location-capable device such as the UE 105, the gNB 110a, 110b, or the LMF 120 based on measurement quantities received at the UE 105 for such directionally-transmitted signals. The gateway mobile location center (GMLC) 125, the location management function (LMF) 120, the access and mobility management function (AMF) 115, the SMF 117, the ng-eNB (eNodeB) 114 and the gNBs (gNodeBs) 110a, 110b are examples and may, in various embodiments, be replaced by or include various other location server functionality and/or base station functionality respectively.

The system 100 is capable of wireless communication in that components of the system 100 can communicate with one another (at least some times using wireless connections) directly or indirectly, e.g., via the gNBs 110a, 110b, the ng-eNB 114, and/or the network 140 (and/or one or more other devices not shown, such as one or more other base transceiver stations). For indirect communications, the communications may be altered during transmission from one entity to another, e.g., to alter header information of data packets, to change format, etc. The UE 105 may include multiple UEs and may be a mobile wireless communication device, but may communicate wirelessly and via wired connections. The UE 105 may be any of a variety of devices, e.g., a smartphone, a tablet computer, a vehicle-based device, etc., but these are examples as the UE 105 is not required to be any of these configurations, and other configurations of UEs may be used. Other UEs may include wearable devices (e.g., smart watches, smart jewelry, smart glasses or headsets, etc.). Still other UEs may be used, whether currently existing or developed in the future. Further, other wireless devices (whether mobile or not) may be implemented within the system 100 and may communicate with each other and/or with the UE 105, the gNBs 110a, 110b, the ng-eNB 114, the core network 140, and/or the external client 130. For example, such other devices may include internet of thing (IoT) devices, medical devices, home entertainment and/or automation devices, etc. The core network 140 may communicate with the external client 130 (e.g., a computer system), e.g., to allow the external client 130 to request and/or receive location information regarding the UE 105 (e.g., via the GMLC 125).

The UE 105 or other devices may be configured to communicate in various networks and/or for various purposes and/or using various technologies (e.g., 5G, Wi-Fi communication, multiple frequencies of Wi-Fi communication, satellite positioning, one or more types of communications (e.g., GSM (Global System for Mobiles), CDMA (Code Division Multiple Access), LTE (Long-Term Evolution), V2X (Vehicle-to-Everything, e.g., V2P (Vehicle-to-Pedestrian), V2I (Vehicle-to-Infrastructure), V2V (Vehicle-to-Vehicle), etc.), IEEE 802.11p, etc.). V2X communications may be cellular (Cellular-V2X (C-V2X)) and/or WiFi (e.g., DSRC (Dedicated Short-Range Connection)). The system 100 may support operation on multiple carriers (waveform signals of different frequencies). Multi-carrier transmitters can transmit modulated signals simultaneously on the multiple carriers. Each modulated signal may be a Code Division Multiple Access (CDMA) signal, a Time Division Multiple Access (TDMA) signal, an Orthogonal Frequency Division Multiple Access (OFDMA) signal, a Single-Carrier Frequency Division Multiple Access (SC-FDMA) signal, etc. Each modulated signal may be sent on a different carrier and may carry pilot, overhead information, data, etc. The UEs 105, 106 may communicate with each other through UE-to-UE sidelink (SL) communications by transmitting over one or more sidelink channels such as a physical sidelink synchronization channel (PSSCH), a physical sidelink broadcast channel (PSBCH), or a physical sidelink control channel (PSCCH).

The UE 105 may comprise and/or may be referred to as a device, a mobile device, a wireless device, a mobile terminal, a terminal, a mobile station (MS), a Secure User Plane Location (SUPL) Enabled Terminal (SET), or by some other name. Moreover, the UE 105 may correspond to a cellphone, smartphone, laptop, tablet, PDA, consumer asset tracking device, navigation device, Internet of Things (IoT) device, health monitors, security systems, smart city sensors, smart meters, wearable trackers, or some other portable or moveable device. Typically, though not necessarily, the UE 105 may support wireless communication using one or more Radio Access Technologies (RATs) such as Global System for Mobile communication (GSM), Code Division Multiple Access (CDMA), Wideband CDMA (WCDMA), LTE, High Rate Packet Data (HRPD), IEEE 802.11 WiFi (also referred to as Wi-Fi), Bluetooth® (BT), Worldwide Interoperability for Microwave Access (WiMAX), 5G new radio (NR) (e.g., using the NG-RAN 135 and the 5GC 140), etc. The UE 105 may support wireless communication using a Wireless Local Area Network (WLAN) which may connect to other networks (e.g., the Internet) using a Digital Subscriber Line (DSL) or packet cable, for example. The use of one or more of these RATs may allow the UE 105 to communicate with the external client 130 (e.g., via elements of the 5GC 140 not shown in FIG. 1, or possibly via the GMLC 125) and/or allow the external client 130 to receive location information regarding the UE 105 (e.g., via the GMLC 125).

The UE 105 may include a single entity or may include multiple entities such as in a personal area network where a user may employ audio, video and/or data I/O (input/output) devices and/or body sensors and a separate wireline or wireless modem. An estimate of a location of the UE 105 may be referred to as a location, location estimate, location fix, fix, position, position estimate, or position fix, and may be geographic, thus providing location coordinates for the UE 105 (e.g., latitude and longitude) which may or may not include an altitude component (e.g., height above sea level, height above or depth below ground level, floor level, or basement level). Alternatively, a location of the UE 105 may be expressed as a civic location (e.g., as a postal address or the designation of some point or small area in a building such as a particular room or floor). A location of the UE 105 may be expressed as an area or volume (defined either geographically or in civic form) within which the UE 105 is expected to be located with some probability or confidence level (e.g., 67%, 95%, etc.). A location of the UE 105 may be expressed as a relative location comprising, for example, a distance and direction from a known location. The relative location may be expressed as relative coordinates (e.g., X, Y (and Z) coordinates) defined relative to some origin at a known location which may be defined, e.g., geographically, in civic terms, or by reference to a point, area, or volume, e.g., indicated on a map, floor plan, or building plan. In the description contained herein, the use of the term location may comprise any of these variants unless indicated otherwise. When computing the location of a UE, it is common to solve for local x, y, and possibly z coordinates and then, if desired, convert the local coordinates into absolute coordinates (e.g., for latitude, longitude, and altitude above or below mean sea level).

The UE 105 may be configured to communicate with other entities using one or more of a variety of technologies. The UE 105 may be configured to connect indirectly to one or more communication networks via one or more device-to-device (D2D) peer-to-peer (P2P) links. The D2D P2P links may be supported with any appropriate D2D radio access technology (RAT), such as LTE Direct (LTE-D), WiFi Direct (WiFi-D), Bluetooth®, and so on. One or more of a group of UEs utilizing D2D communications may be within a geographic coverage area of a Transmission/Reception Point (TRP) such as one or more of the gNBs 110a, 110b, and/or the ng-eNB 114. Other UEs in such a group may be outside such geographic coverage areas, or may be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP. One or more of a group of UEs utilizing D2D communications may be within a geographic coverage area of a TRP. Other UEs in such a group may be outside such geographic coverage areas, or be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP.

Base stations (BSs) in the NG-RAN 135 shown in FIG. 1 include NR Node Bs, referred to as the gNBs 110a and 110b. Pairs of the gNBs 110a, 110b in the NG-RAN 135 may be connected to one another via one or more other gNBs. Access to the 5G network is provided to the UE 105 via wireless communication between the UE 105 and one or more of the gNBs 110a, 110b, which may provide wireless communications access to the 5GC 140 on behalf of the UE 105 using 5G. In FIG. 1, the serving gNB for the UE 105 is assumed to be the gNB 110a, although another gNB (e.g. the gNB 110b) may act as a serving gNB if the UE 105 moves to another location or may act as a secondary gNB to provide additional throughput and bandwidth to the UE 105.

Base stations (BSs) in the NG-RAN 135 shown in FIG. 1 may include the ng-eNB 114, also referred to as a next generation evolved Node B. The ng-eNB 114 may be connected to one or more of the gNBs 110a, 110b in the NG-RAN 135, possibly via one or more other gNBs and/or one or more other ng-eNBs. The ng-eNB 114 may provide LTE wireless access and/or evolved LTE (eLTE) wireless access to the UE 105. One or more of the gNBs 110a, 110b and/or the ng-eNB 114 may be configured to function as positioning-only beacons which may transmit signals to assist with determining the position of the UE 105 but may not receive signals from the UE 105 or from other UEs.

The gNBs 110a, 110b and/or the ng-eNB 114 may each comprise one or more TRPs. For example, each sector within a cell of a BS may comprise a TRP, although multiple TRPs may share one or more components (e.g., share a processor but have separate antennas). The system 100 may include macro TRPs exclusively or the system 100 may have TRPs of different types, e.g., macro, pico, and/or femto TRPs, etc. A macro TRP may cover a relatively large geographic area (e.g., several kilometers in radius) and may allow unrestricted access by terminals with service subscription. A pico TRP may cover a relatively small geographic area (e.g., a pico cell) and may allow unrestricted access by terminals with service subscription. A femto or home TRP may cover a relatively small geographic area (e.g., a femto cell) and may allow restricted access by terminals having association with the femto cell (e.g., terminals for users in a home).

As noted, while FIG. 1 depicts nodes configured to communicate according to 5G communication protocols, nodes configured to communicate according to other communication protocols, such as, for example, an LTE protocol or IEEE 802.11x protocol, may be used. For example, in an Evolved Packet System (EPS) providing LTE wireless access to the UE 105, a RAN may comprise an Evolved Universal Mobile Telecommunications System (UMTS) Terrestrial Radio Access Network (E-UTRAN) which may comprise base stations comprising evolved Node Bs (eNBs). A core network for EPS may comprise an Evolved Packet Core (EPC). An EPS may comprise an E-UTRAN plus EPC, where the E-UTRAN corresponds to the NG-RAN 135 and the EPC corresponds to the 5GC 140 in FIG. 1.

The gNBs 110a, 110b and the ng-eNB 114 may communicate with the AMF 115, which, for positioning functionality, communicates with the LMF 120. The AMF 115 may support mobility of the UE 105, including cell change and handover and may participate in supporting a signaling connection to the UE 105 and possibly data and voice bearers for the UE 105. The LMF 120 may communicate directly with the UE 105, e.g., through wireless communications, or directly with the gNBs 110a, 110b and/or the ng-eNB 114. The LMF 120 may support positioning of the UE 105 when the UE 105 accesses the NG-RAN 135 and may support position procedures/methods such as Assisted GNSS (A-GNSS), Observed Time Difference of Arrival (OTDOA) (e.g., Downlink (DL) OTDOA or Uplink (UL) OTDOA), Round Trip Time (RTT), Multi-Cell RTT, Real Time Kinematic (RTK), Precise Point Positioning (PPP), Differential GNSS (DGNSS), Enhanced Cell ID (E-CID), angle of arrival (AoA), angle of departure (AoD), and/or other position methods. The LMF 120 may process location services requests for the UE 105, e.g., received from the AMF 115 or from the GMLC 125. The LMF 120 may be connected to the AMF 115 and/or to the GMLC 125. The LMF 120 may be referred to by other names such as a Location Manager (LM), Location Function (LF), commercial LMF (CLMF), or value added LMF (VLMF). A node/system that implements the LMF 120 may additionally or alternatively implement other types of location-support modules, such as an Enhanced Serving Mobile Location Center (E-SMLC) or a Secure User Plane Location (SUPL) Location Platform (SLP). At least part of the positioning functionality (including derivation of the location of the UE 105) may be performed at the UE 105 (e.g., using signal measurements obtained by the UE 105 for signals transmitted by wireless nodes such as the gNBs 110a, 110b and/or the ng-eNB 114, and/or assistance data provided to the UE 105, e.g. by the LMF 120). The AMF 115 may serve as a control node that processes signaling between the UE 105 and the core network 140, and may provide QoS (Quality of Service) flow and session management. The AMF 115 may support mobility of the UE 105 including cell change and handover and may participate in supporting signaling connection to the UE 105.

The GMLC 125 may support a location request for the UE 105 received from the external client 130 and may forward such a location request to the AMF 115 for forwarding by the AMF 115 to the LMF 120 or may forward the location request directly to the LMF 120. A location response from the LMF 120 (e.g., containing a location estimate for the UE 105) may be returned to the GMLC 125 either directly or via the AMF 115 and the GMLC 125 may then return the location response (e.g., containing the location estimate) to the external client 130. The GMLC 125 is shown connected to both the AMF 115 and LMF 120, though may not be connected to the AMF 115 or the LMF 120 in some implementations.

As further illustrated in FIG. 1, the LMF 120 may communicate with the gNBs 110*a*, 110*b* and/or the ng-eNB 114 using a New Radio Position Protocol A (which may be referred to as NPPa or NRPPa), which may be defined in 3GPP Technical Specification (TS) 38.455. NRPPa may be the same as, similar to, or an extension of the LTE Positioning Protocol A (LPPa) defined in 3GPP TS 36.455, with NRPPa messages being transferred between the gNB 110*a* (or the gNB 110*b*) and the LMF 120, and/or between the ng-eNB 114 and the LMF 120, via the AMF 115. As further illustrated in FIG. 1, the LMF 120 and the UE 105 may communicate using an LTE Positioning Protocol (LPP), which may be defined in 3GPP TS 36.355. The LMF 120 and the UE 105 may also or instead communicate using a New Radio Positioning Protocol (which may be referred to as NPP or NRPP), which may be the same as, similar to, or an extension of LPP. Here, LPP and/or NPP messages may be transferred between the UE 105 and the LMF 120 via the AMF 115 and the serving gNB 110*a*, 110*b* or the serving ng-eNB 114 for the UE 105. For example, LPP and/or NPP messages may be transferred between the LMF 120 and the AMF 115 using a 5G Location Services Application Protocol (LCS AP) and may be transferred between the AMF 115 and the UE 105 using a 5G Non-Access Stratum (NAS) protocol. The LPP and/or NPP protocol may be used to support positioning of the UE 105 using UE-assisted and/or UE-based position methods such as A-GNSS, RTK, OTDOA and/or E-CID. The NRPPa protocol may be used to support positioning of the UE 105 using network-based position methods such as E-CID (e.g., when used with measurements obtained by the gNB 110*a*, 110*b* or the ng-eNB 114) and/or may be used by the LMF 120 to obtain location related information from the gNBs 110*a*, 110*b* and/or the ng-eNB 114, such as parameters defining directional SS transmissions from the gNBs 110*a*, 110*b*, and/or the ng-eNB 114. The LMF 120 may be co-located or integrated with a gNB or a TRP, or may be disposed remote from the gNB and/or the TRP and configured to communicate directly or indirectly with the gNB and/or the TRP.

With a UE-assisted position method, the UE 105 may obtain location measurements and send the measurements to a location server (e.g., the LMF 120) for computation of a location estimate for the UE 105. For example, the location measurements may include one or more of a Received Signal Strength Indication (RSSI), Round Trip signal propagation Time (RTT), Reference Signal Time Difference (RSTD), Reference Signal Received Power (RSRP) and/or Reference Signal Received Quality (RSRQ) for the gNBs 110*a*, 110*b*, the ng-eNB 114, and/or a WLAN AP. The location measurements may also or instead include measurements of GNSS pseudorange, code phase, and/or carrier phase for the SVs 190-193.

With a UE-based position method, the UE 105 may obtain location measurements (e.g., which may be the same as or similar to location measurements for a UE-assisted position method) and may compute a location of the UE 105 (e.g., with the help of assistance data received from a location server such as the LMF 120 or broadcast by the gNBs 110*a*, 110*b*, the ng-eNB 114, or other base stations or APs).

With a network-based position method, one or more base stations (e.g., the gNBs 110*a*, 110*b*, and/or the ng-eNB 114) or APs may obtain location measurements (e.g., measurements of RSSI, RTT, RSRP, RSRQ or Time of Arrival (ToA) for signals transmitted by the UE 105) and/or may receive measurements obtained by the UE 105. The one or more base stations or APs may send the measurements to a location server (e.g., the LMF 120) for computation of a location estimate for the UE 105.

Information provided by the gNBs 110*a*, 110*b*, and/or the ng-eNB 114 to the LMF 120 using NRPPa may include timing and configuration information for directional SS transmissions and location coordinates. The LMF 120 may provide some or all of this information to the UE 105 as assistance data in an LPP and/or NPP message via the NG-RAN 135 and the 5GC 140.

An LPP or NPP message sent from the LMF 120 to the UE 105 may instruct the UE 105 to do any of a variety of things depending on desired functionality. For example, the LPP or NPP message could contain an instruction for the UE 105 to obtain measurements for GNSS (or A-GNSS), WLAN, E-CID, and/or OTDOA (or some other position method). In the case of E-CID, the LPP or NPP message may instruct the UE 105 to obtain one or more measurement quantities (e.g., beam ID, beam width, mean angle, RSRP, RSRQ measurements) of directional signals transmitted within particular cells supported by one or more of the gNBs 110*a*, 110*b*, and/or the ng-eNB 114 (or supported by some other type of base station such as an eNB or WiFi AP). The UE 105 may send the measurement quantities back to the LMF 120 in an LPP or NPP message (e.g., inside a 5G NAS message) via the serving gNB 110*a* (or the serving ng-eNB 114) and the AMF 115.

As noted, while the communication system 100 is described in relation to 5G technology, the communication system 100 may be implemented to support other communication technologies, such as GSM, WCDMA, LTE, etc., that are used for supporting and interacting with mobile devices such as the UE 105 (e.g., to implement voice, data, positioning, and other functionalities). In some such embodiments, the 5GC 140 may be configured to control different air interfaces. For example, the 5GC 140 may be connected to a WLAN using a Non-3GPP InterWorking Function (N3IWF, not shown FIG. 1) in the 5GC 150. For example, the WLAN may support IEEE 802.11 WiFi access for the UE 105 and may comprise one or more WiFi APs. Here, the N3IWF may connect to the WLAN and to other elements in the 5GC 140 such as the AMF 115. In some embodiments, both the NG-RAN 135 and the 5GC 140 may be replaced by one or more other RANs and one or more other core networks. For example, in an EPS, the NG-RAN 135 may be replaced by an E-UTRAN containing eNBs and the 5GC 140 may be replaced by an EPC containing a Mobility Management Entity (MME) in place of the AMF 115, an E-SMLC in place of the LMF 120, and a GMLC that may be similar to the GMLC 125. In such an EPS, the E-SMLC may use LPPa in place of NRPPa to send and receive location information to and from the eNBs in the E-U IRAN and may use LPP to support positioning of the UE 105. In these other embodiments, positioning of the UE 105 using directional PRSs may be supported in an analogous manner to that described herein for a 5G network with the difference that functions and procedures described herein for the gNBs 110a, 110b, the ng-eNB 114, the AMF 115, and the LMF 120 may, in some cases, apply instead to other network elements such eNBs, WiFi APs, an MME, and an E-SMLC.

As noted, in some embodiments, positioning functionality may be implemented, at least in part, using the directional SS beams, sent by base stations (such as the gNBs 110a, 110b, and/or the ng-eNB 114) that are within range of the UE whose position is to be determined (e.g., the UE 105 of FIG. 1). The UE may, in some instances, use the directional SS beams from a plurality of base stations (such as the gNBs 110a, 110b, the ng-eNB 114, etc.) to compute the UE's position.

Figure 2:
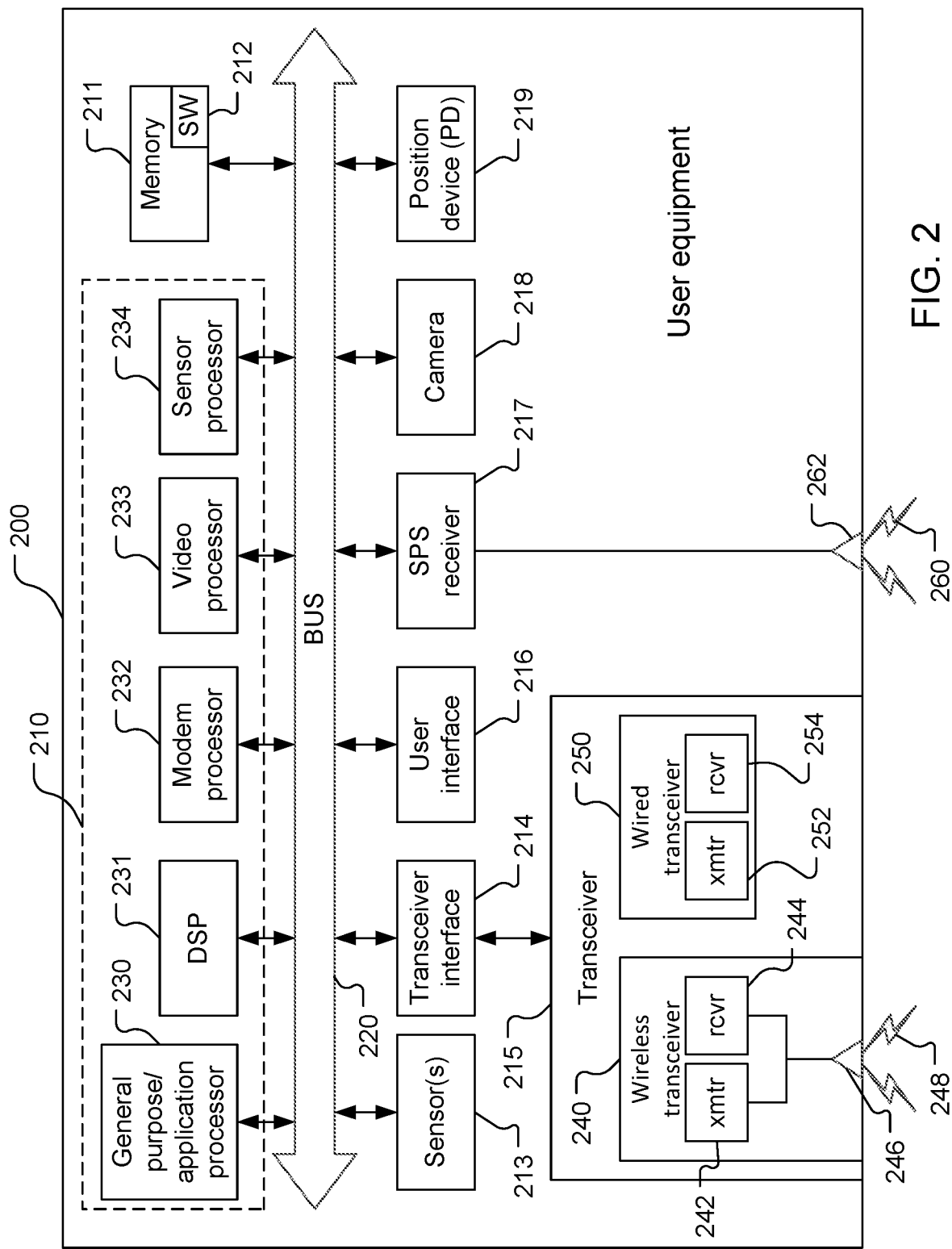
FIG. 2 is a block diagram of components of an example user equipment shown in FIG. 1.

Referring also to FIG. 2, a UE 200 is an example of one of the UEs 105, 106 and comprises a computing platform including a processor 210, memory 211 including software (SW) 212, one or more sensors 213, a transceiver interface 214 for a transceiver 215 (that includes a wireless transceiver 240 and a wired transceiver 250), a user interface 216, a Satellite Positioning System (SPS) receiver 217, a camera 218, and a position device (PD) 219. The processor 210, the memory 211, the sensor(s) 213, the transceiver interface 214, the user interface 216, the SPS receiver 217, the camera 218, and the position device 219 may be communicatively coupled to each other by a bus 220 (which may be configured, e.g., for optical and/or electrical communication). One or more of the shown apparatus (e.g., the camera 218, the position device 219, and/or one or more of the sensor(s) 213, etc.) may be omitted from the UE 200. The processor 210 may include one or more intelligent hardware devices, e.g., a central processing unit (CPU), a microcontroller, an application specific integrated circuit (ASIC), etc. The processor 210 may comprise multiple processors including a general-purpose/application processor 230, a Digital Signal Processor (DSP) 231, a modem processor 232, a video processor 233, and/or a sensor processor 234. One or more of the processors 230-234 may comprise multiple devices (e.g., multiple processors). For example, the sensor processor 234 may comprise, e.g., processors for RF (radio frequency) sensing (with one or more (cellular) wireless signals transmitted and reflection(s) used to identify, map, and/or track an object), and/or ultrasound, etc. The modem processor 232 may support dual SIM/dual connectivity (or even more SIMs). For example, a SIM (Subscriber Identity Module or Subscriber Identification Module) may be used by an Original Equipment Manufacturer (OEM), and another SIM may be used by an end user of the UE 200 for connectivity. The memory 211 is a non-transitory storage medium that may include random access memory (RAM), flash memory, disc memory, and/or read-only memory (ROM), etc. The memory 211 stores the software 212 which may be processor-readable, processor-executable software code containing instructions that are configured to, when executed, cause the processor 210 to perform various functions described herein. Alternatively, the software 212 may not be directly executable by the processor 210 but may be configured to cause the processor 210, e.g., when compiled and executed, to perform the functions. The description may refer to the processor 210 performing a function, but this includes other implementations such as where the processor 210 executes software and/or firmware. The description may refer to the processor 210 performing a function as shorthand for one or more of the processors 230-234 performing the function. The description may refer to the UE 200 performing a function as shorthand for one or more appropriate components of the UE 200 performing the function. The processor 210 may include a memory with stored instructions in addition to and/or instead of the memory 211. Functionality of the processor 210 is discussed more fully below.

The configuration of the UE 200 shown in FIG. 2 is an example and not limiting of the disclosure, including the claims, and other configurations may be used. For example, an example configuration of the UE includes one or more of the processors 230-234 of the processor 210, the memory 211, and the wireless transceiver 240. Other example configurations include one or more of the processors 230-234 of the processor 210, the memory 211, a wireless transceiver, and one or more of the sensor(s) 213, the user interface 216, the SPS receiver 217, the camera 218, the PD 219, and/or a wired transceiver.

The UE 200 may comprise the modem processor 232 that may be capable of performing baseband processing of signals received and down-converted by the transceiver 215 and/or the SPS receiver 217. The modem processor 232 may perform baseband processing of signals to be upconverted for transmission by the transceiver 215. Also or alternatively, baseband processing may be performed by the processor 230 and/or the DSP 231. Other configurations, however, may be used to perform baseband processing.

The UE 200 may include the sensor(s) 213 that may include, for example, one or more of various types of sensors such as one or more inertial sensors, one or more magnetometers, one or more environment sensors, one or more optical sensors, one or more weight sensors, and/or one or more radio frequency (RF) sensors, etc. An inertial measurement unit (IMU) may comprise, for example, one or more accelerometers (e.g., collectively responding to acceleration of the UE 200 in three dimensions) and/or one or more gyroscopes (e.g., three-dimensional gyroscope(s)). The sensor(s) 213 may include one or more magnetometers (e.g., three-dimensional magnetometer(s)) to determine orientation (e.g., relative to magnetic north and/or true north) that may be used for any of a variety of purposes, e.g., to support one or more compass applications. The environment sensor(s) may comprise, for example, one or more temperature sensors, one or more barometric pressure sensors, one or more ambient light sensors, one or more camera imagers, and/or one or more microphones, etc. The sensor(s) 213 may generate analog and/or digital signals indications of which may be stored in the memory 211 and processed by the DSP 231 and/or the processor 230 in support of one or more applications such as, for example, applications directed to positioning and/or navigation operations.

The sensor(s) 213 may be used in relative location measurements, relative location determination, motion determination, etc. Information detected by the sensor(s) 213 may be used for motion detection, relative displacement, dead reckoning, sensor-based location determination, and/or sensor-assisted location determination. The sensor(s) 213 may be useful to determine whether the UE 200 is fixed (stationary) or mobile and/or whether to report certain useful information to the LMF 120 regarding the mobility of the UE 200. For example, based on the information obtained/measured by the sensor(s) 213, the UE 200 may notify/report to the LMF 120 that the UE 200 has detected movements or that the UE 200 has moved, and report the relative displacement/distance (e.g., via dead reckoning, or sensor-based location determination, or sensor-assisted location determination enabled by the sensor(s) 213). In another example, for relative positioning information, the sensors/IMU can be used to determine the angle and/or orientation of the other device with respect to the UE 200, etc.

The IMU may be configured to provide measurements about a direction of motion and/or a speed of motion of the UE 200, which may be used in relative location determination. For example, one or more accelerometers and/or one or more gyroscopes of the IMU may detect, respectively, a linear acceleration and a speed of rotation of the UE 200. The linear acceleration and speed of rotation measurements of the UE 200 may be integrated over time to determine an instantaneous direction of motion as well as a displacement of the UE 200. The instantaneous direction of motion and the displacement may be integrated to track a location of the UE 200. For example, a reference location of the UE 200 may be determined, e.g., using the SPS receiver 217 (and/or by some other means) for a moment in time and measurements from the accelerometer(s) and gyroscope(s) taken after this moment in time may be used in dead reckoning to determine present location of the UE 200 based on movement (direction and distance) of the UE 200 relative to the reference location.

The magnetometer(s) may determine magnetic field strengths in different directions which may be used to determine orientation of the UE 200. For example, the orientation may be used to provide a digital compass for the UE 200. The magnetometer(s) may include a two-dimensional magnetometer configured to detect and provide indications of magnetic field strength in two orthogonal dimensions. The magnetometer(s) may include a three-dimensional magnetometer configured to detect and provide indications of magnetic field strength in three orthogonal dimensions. The magnetometer(s) may provide means for sensing a magnetic field and providing indications of the magnetic field, e.g., to the processor 210.

The transceiver 215 may include a wireless transceiver 240 and a wired transceiver 250 configured to communicate with other devices through wireless connections and wired connections, respectively. For example, the wireless transceiver 240 may include a wireless transmitter 242 and a wireless receiver 244 coupled to one or more antennas 246 for transmitting (e.g., on one or more uplink channels and/or one or more sidelink channels) and/or receiving (e.g., on one or more downlink channels and/or one or more sidelink channels) wireless signals 248 and transducing signals from the wireless signals 248 to wired (e.g., electrical and/or optical) signals and from wired (e.g., electrical and/or optical) signals to the wireless signals 248. Thus, the wireless transmitter 242 may include multiple transmitters that may be discrete components or combined/integrated components, and/or the wireless receiver 244 may include multiple receivers that may be discrete components or combined/integrated components. The wireless transceiver 240 may be configured to communicate signals (e.g., with TRPs and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. New Radio may use mm-wave frequencies and/or sub-6 GHz frequencies. The wired transceiver 250 may include a wired transmitter 252 and a wired receiver 254 configured for wired communication, e.g., a network interface that may be utilized to communicate with the network 135 to send communications to, and receive communications from, the network 135. The wired transmitter 252 may include multiple transmitters that may be discrete components or combined/integrated components, and/or the wired receiver 254 may include multiple receivers that may be discrete components or combined/integrated components. The wired transceiver 250 may be configured, e.g., for optical communication and/or electrical communication. The transceiver 215 may be communicatively coupled to the transceiver interface 214, e.g., by optical and/or electrical connection. The transceiver interface 214 may be at least partially integrated with the transceiver 215.

The transceiver 215 may be configured to send and receive other types of signals. For example, the transceiver 215 may be configured to send and receive radar, sonar, ultrasound, and/or lidar signals, e.g., under the control of the sensor processor 234. The wireless transmitter 242, the wireless receiver 244, and/or the antenna 246, may include multiple transmitters, multiple receivers, and/or multiple antennas, respectively, for sending and/or receiving, respectively, appropriate signals.

The user interface 216 may comprise one or more of several devices such as, for example, a speaker, microphone, display device, vibration device, keyboard, touch screen, etc. The user interface 216 may include more than one of any of these devices. The user interface 216 may be configured to enable a user to interact with one or more applications hosted by the UE 200. For example, the user interface 216 may store indications of analog and/or digital signals in the memory 211 to be processed by DSP 231 and/or the general-purpose processor 230 in response to action from a user. Similarly, applications hosted on the UE 200 may store indications of analog and/or digital signals in the memory 211 to present an output signal to a user. The user interface 216 may include an audio input/output (I/O) device comprising, for example, a speaker, a microphone, digital-to-analog circuitry, analog-to-digital circuitry, an amplifier and/or gain control circuitry (including more than one of any of these devices). Other configurations of an audio I/O device may be used. Also or alternatively, the user interface 216 may comprise one or more touch sensors responsive to touching and/or pressure, e.g., on a keyboard and/or touch screen of the user interface 216.

The SPS receiver 217 (e.g., a Global Positioning System (GPS) receiver) may be capable of receiving and acquiring SPS signals 260 via an SPS antenna 262. The antenna 262 is configured to transduce the wireless SPS signals 260 to wired signals, e.g., electrical or optical signals, and may be integrated with the antenna 246. The SPS receiver 217 may be configured to process, in whole or in part, the acquired SPS signals 260 for estimating a location of the UE 200. For example, the SPS receiver 217 may be configured to determine location of the UE 200 by trilateration using the SPS signals 260. The general-purpose processor 230, the memory 211, the DSP 231 and/or one or more specialized processors (not shown) may be utilized to process acquired SPS signals, in whole or in part, and/or to calculate an estimated location of the UE 200, in conjunction with the SPS receiver 217. The memory 211 may store indications (e.g., measurements) of the SPS signals 260 and/or other signals (e.g., signals acquired from the wireless transceiver 240) for use in performing positioning operations. The general-purpose processor 230, the DSP 231, and/or one or more specialized processors, and/or the memory 211 may provide or support a location engine for use in processing measurements to estimate a location of the UE 200.

The UE 200 may include the camera 218 for capturing still or moving imagery. The camera 218 may comprise, for example, an imaging sensor (e.g., a charge coupled device or a CMOS imager), a lens, analog-to-digital circuitry, frame buffers, etc. Additional processing, conditioning, encoding, and/or compression of signals representing captured images may be performed by the general-purpose processor 230 and/or the DSP 231. Also or alternatively, the video processor 233 may perform conditioning, encoding, compression, and/or manipulation of signals representing captured images. The video processor 233 may decode/decompress stored image data for presentation on a display device (not shown), e.g., of the user interface 216.

The position device (PD) 219 may be configured to determine a position of the UE 200, motion of the UE 200, and/or relative position of the UE 200, and/or time. For example, the PD 219 may communicate with, and/or include some or all of, the SPS receiver 217. The PD 219 may work in conjunction with the processor 210 and the memory 211 as appropriate to perform at least a portion of one or more positioning methods, although the description herein may refer to the PD 219 being configured to perform, or performing, in accordance with the positioning method(s). The PD 219 may also or alternatively be configured to determine location of the UE 200 using terrestrial-based signals (e.g., at least some of the signals 248) for trilateration, for assistance with obtaining and using the SPS signals 260, or both. The PD 219 may be configured to use one or more other techniques (e.g., relying on the UE's self-reported location (e.g., part of the UE's position beacon)) for determining the location of the UE 200, and may use a combination of techniques (e.g., SPS and terrestrial positioning signals) to determine the location of the UE 200. The PD 219 may include one or more of the sensors 213 (e.g., gyroscope(s), accelerometer(s), magnetometer(s), etc.) that may sense orientation and/or motion of the UE 200 and provide indications thereof that the processor 210 (e.g., the processor 230 and/or the DSP 231) may be configured to use to determine motion (e.g., a velocity vector and/or an acceleration vector) of the UE 200. The PD 219 may be configured to provide indications of uncertainty and/or error in the determined position and/or motion. Functionality of the PD 219 may be provided in a variety of manners and/or configurations, e.g., by the general purpose/application processor 230, the transceiver 215, the SPS receiver 217, and/or another component of the UE 200, and may be provided by hardware, software, firmware, or various combinations thereof.

Figure 3:
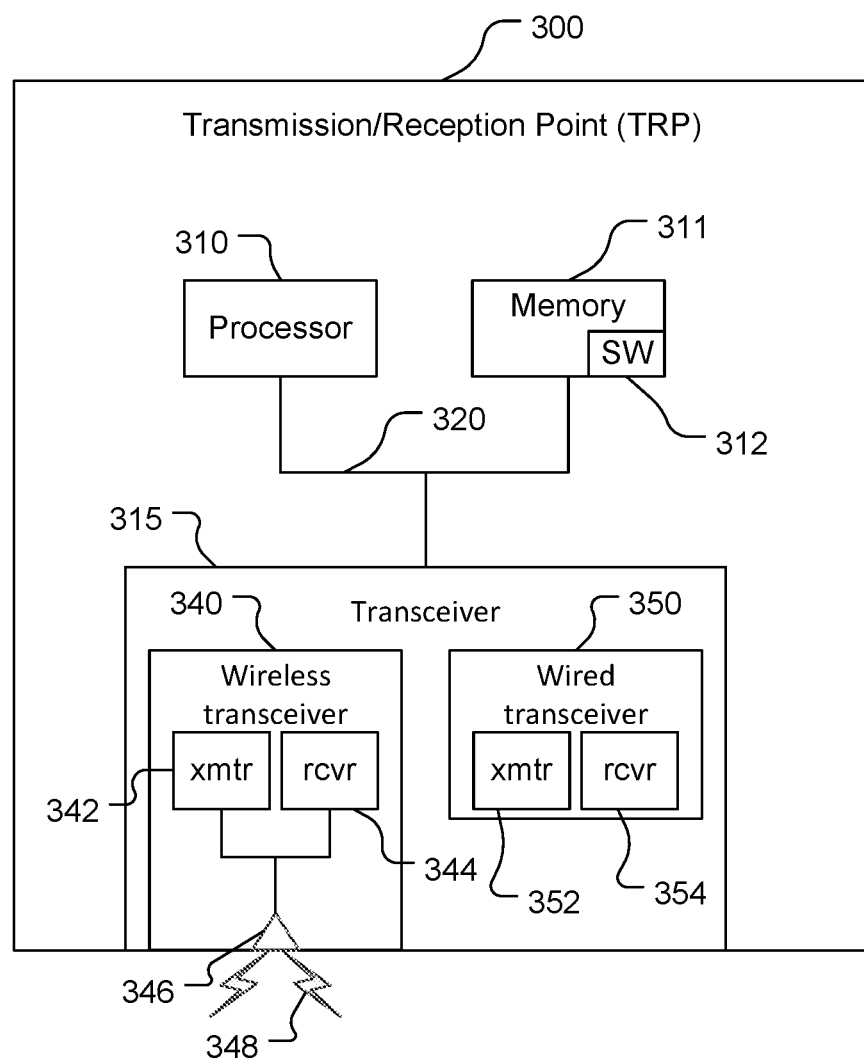
FIG. 3 is a block diagram of components of an example transmission/reception point.

Referring also to FIG. 3, an example of a TRP 300 of the gNBs 110a, 110b and/or the ng-eNB 114 comprises a computing platform including a processor 310, memory 311 including software (SW) 312, and a transceiver 315. The processor 310, the memory 311, and the transceiver 315 may be communicatively coupled to each other by a bus 320 (which may be configured, e.g., for optical and/or electrical communication). One or more of the shown apparatus (e.g., a wireless interface) may be omitted from the TRP 300. The processor 310 may include one or more intelligent hardware devices, e.g., a central processing unit (CPU), a microcontroller, an application specific integrated circuit (ASIC), etc. The processor 310 may comprise multiple processors (e.g., including a general-purpose/application processor, a DSP, a modem processor, a video processor, and/or a sensor processor as shown in FIG. 2). The memory 311 is a non-transitory storage medium that may include random access memory (RAM)), flash memory, disc memory, and/or read-only memory (ROM), etc. The memory 311 stores the software 312 which may be processor-readable, processor-executable software code containing instructions that are configured to, when executed, cause the processor 310 to perform various functions described herein. Alternatively, the software 312 may not be directly executable by the processor 310 but may be configured to cause the processor 310, e.g., when compiled and executed, to perform the functions.

The description may refer to the processor 310 performing a function, but this includes other implementations such as where the processor 310 executes software and/or firmware. The description may refer to the processor 310 performing a function as shorthand for one or more of the processors contained in the processor 310 performing the function. The description may refer to the TRP 300 performing a function as shorthand for one or more appropriate components (e.g., the processor 310 and the memory 311) of the TRP 300 (and thus of one of the gNBs 110a, 110b and/or the ng-eNB 114) performing the function. The processor 310 may include a memory with stored instructions in addition to and/or instead of the memory 311. Functionality of the processor 310 is discussed more fully below.

The transceiver 315 may include a wireless transceiver 340 and/or a wired transceiver 350 configured to communicate with other devices through wireless connections and wired connections, respectively. For example, the wireless transceiver 340 may include a wireless transmitter 342 and a wireless receiver 344 coupled to one or more antennas 346 for transmitting (e.g., on one or more uplink channels and/or one or more downlink channels) and/or receiving (e.g., on one or more downlink channels and/or one or more uplink channels) wireless signals 348 and transducing signals from the wireless signals 348 to wired (e.g., electrical and/or optical) signals and from wired (e.g., electrical and/or optical) signals to the wireless signals 348. Thus, the wireless transmitter 342 may include multiple transmitters that may be discrete components or combined/integrated components, and/or the wireless receiver 344 may include multiple receivers that may be discrete components or combined/integrated components. The wireless transceiver 340 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 350 may include a wired transmitter 352 and a wired receiver 354 configured for wired communication, e.g., a network interface that may be utilized to communicate with the network 135 to send communications to, and receive communications from, the LMF 120, for example, and/or one or more other network entities. The wired transmitter 352 may include multiple transmitters that may be discrete components or combined/integrated components, and/or the wired receiver 354 may include multiple receivers that may be discrete components or combined/integrated components. The wired transceiver 350 may be configured, e.g., for optical communication and/or electrical communication.

The configuration of the TRP 300 shown in FIG. 3 is an example and not limiting of the disclosure, including the claims, and other configurations may be used. For example, the description herein discusses that the TRP 300 is configured to perform or performs several functions, but one or more of these functions may be performed by the LMF 120 and/or the UE 200 (i.e., the LMF 120 and/or the UE 200 may be configured to perform one or more of these functions).

Figure 4:
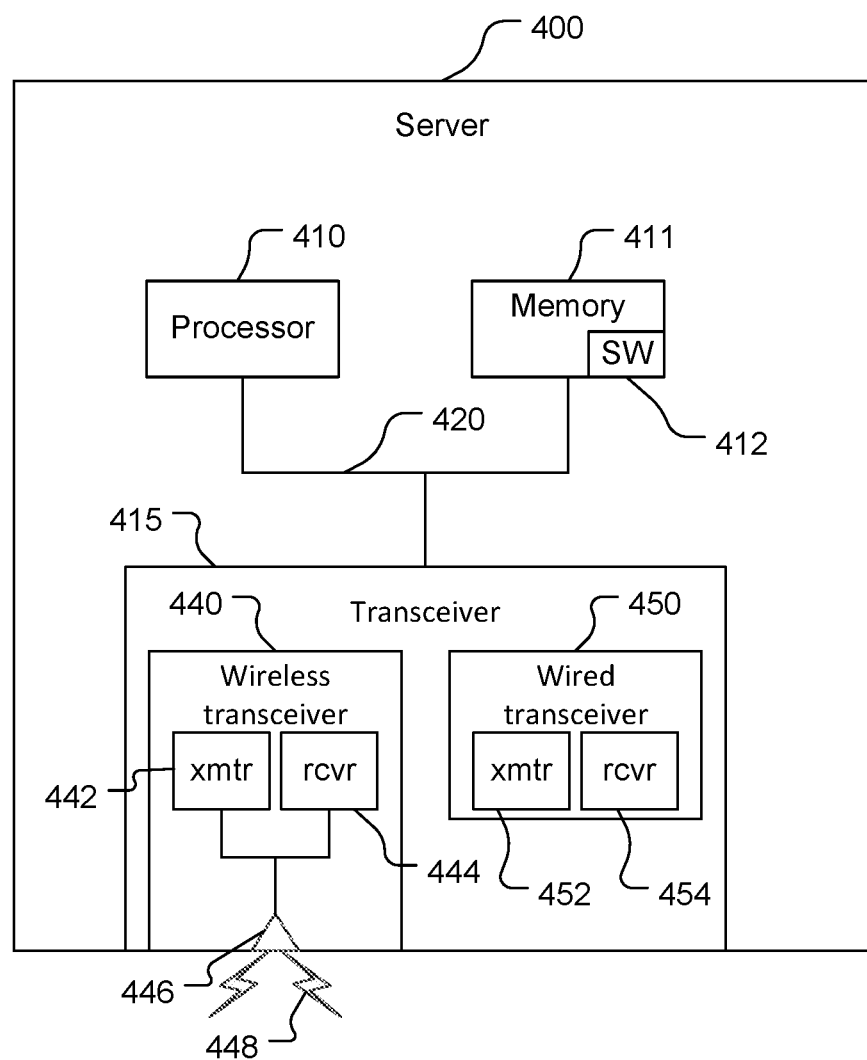
FIG. 4 is a block diagram of components of an example server various examples of which are shown in FIG. 1.

Referring also to FIG. 4, a server 400, of which the LMF 120 is an example, comprises a computing platform including a processor 410, memory 411 including software (SW) 412, and a transceiver 415. The processor 410, the memory 411, and the transceiver 415 may be communicatively coupled to each other by a bus 420 (which may be configured, e.g., for optical and/or electrical communication). One or more of the shown apparatus (e.g., a wireless interface) may be omitted from the server 400. The processor 410 may include one or more intelligent hardware devices, e.g., a central processing unit (CPU), a microcontroller, an application specific integrated circuit (ASIC), etc. The processor 410 may comprise multiple processors (e.g., including a general-purpose/application processor, a DSP, a modem processor, a video processor, and/or a sensor processor as shown in FIG. 2). The memory 411 is a non-transitory storage medium that may include random access memory (RAM)), flash memory, disc memory, and/or read-only memory (ROM), etc. The memory 411 stores the software 412 which may be processor-readable, processor-executable software code containing instructions that are configured to, when executed, cause the processor 410 to perform various functions described herein. Alternatively, the software 412 may not be directly executable by the processor 410 but may be configured to cause the processor 410, e.g., when compiled and executed, to perform the functions. The description may refer to the processor 410 performing a function, but this includes other implementations such as where the processor 410 executes software and/or firmware. The description may refer to the processor 410 performing a function as shorthand for one or more of the processors contained in the processor 410 performing the function. The description may refer to the server 400 performing a function as shorthand for one or more appropriate components of the server 400 performing the function. The processor 410 may include a memory with stored instructions in addition to and/or instead of the memory 411. Functionality of the processor 410 is discussed more fully below.

The transceiver 415 may include a wireless transceiver 440 and/or a wired transceiver 450 configured to communicate with other devices through wireless connections and wired connections, respectively. For example, the wireless transceiver 440 may include a wireless transmitter 442 and a wireless receiver 444 coupled to one or more antennas 446 for transmitting (e.g., on one or more downlink channels) and/or receiving (e.g., on one or more uplink channels) wireless signals 448 and transducing signals from the wireless signals 448 to wired (e.g., electrical and/or optical) signals and from wired (e.g., electrical and/or optical) signals to the wireless signals 448. Thus, the wireless transmitter 442 may include multiple transmitters that may be discrete components or combined/integrated components, and/or the wireless receiver 444 may include multiple receivers that may be discrete components or combined/integrated components. The wireless transceiver 440 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 450 may include a wired transmitter 452 and a wired receiver 454 configured for wired communication, e.g., a network interface that may be utilized to communicate with the network 135 to send communications to, and receive communications from, the TRP 300, for example, and/or one or more other network entities. The wired transmitter 452 may include multiple transmitters that may be discrete components or combined/integrated components, and/or the wired receiver 454 may include multiple receivers that may be discrete components or combined/integrated components. The wired transceiver 450 may be configured, e.g., for optical communication and/or electrical communication.

The description herein may refer to the processor 410 performing a function, but this includes other implementations such as where the processor 410 executes software (stored in the memory 411) and/or firmware. The description herein may refer to the server 400 performing a function as shorthand for one or more appropriate components (e.g., the processor 410 and the memory 411) of the server 400 performing the function.

The configuration of the server 400 shown in FIG. 4 is an example and not limiting of the disclosure, including the claims, and other configurations may be used. For example, the wireless transceiver 440 may be omitted. Also or alternatively, the description herein discusses that the server 400 is configured to perform or performs several functions, but one or more of these functions may be performed by the TRP 300 and/or the UE 200 (i.e., the TRP 300 and/or the UE 200 may be configured to perform one or more of these functions).

Positioning Techniques

For terrestrial positioning of a UE in cellular networks, techniques such as Advanced Forward Link Trilateration (AFLT) and Observed Time Difference Of Arrival (OT-DOA) often operate in "UE-assisted" mode in which measurements of reference signals (e.g., PRS, CRS, etc.) transmitted by base stations are taken by the UE and then provided to a location server. The location server then calculates the position of the UE based on the measurements and known locations of the base stations. Because these techniques use the location server to calculate the position of the UE, rather than the UE itself, these positioning techniques are not frequently used in applications such as car or cell-phone navigation, which instead typically rely on satellite-based positioning.

A UE may use a Satellite Positioning System (SPS) (a Global Navigation Satellite System (GNSS)) for high-accuracy positioning using precise point positioning (PPP) or real time kinematic (RTK) technology. These technologies use assistance data such as measurements from ground-based stations. LTE Release 15 allows the data to be encrypted so that the UEs subscribed to the service exclusively can read the information. Such assistance data varies with time. Thus, a UE subscribed to the service may not easily "break encryption" for other UEs by passing on the data to other UEs that have not paid for the subscription. The passing on would need to be repeated every time the assistance data changes.

In UE-assisted positioning, the UE sends measurements (e.g., TDOA, Angle of Arrival (AoA), etc.) to the positioning server (e.g., LMF/eSMLC). The positioning server has the base station almanac (BSA) that contains multiple 'entries' or 'records', one record per cell, where each record contains geographical cell location but also may include other data. An identifier of the 'record' among the multiple 'records' in the BSA may be referenced. The BSA and the measurements from the UE may be used to compute the position of the UE.

In conventional UE-based positioning, a UE computes its own position, thus avoiding sending measurements to the network (e.g., location server), which in turn improves latency and scalability. The UE uses relevant BSA record information (e.g., locations of gNBs (more broadly base stations)) from the network. The BSA information may be encrypted. But since the BSA information varies much less often than, for example, the PPP or RTK assistance data described earlier, it may be easier to make the BSA information (compared to the PPP or RTK information) available to UEs that did not subscribe and pay for decryption keys. Transmissions of reference signals by the gNBs make BSA information potentially accessible to crowd-sourcing or war-driving, essentially enabling BSA information to be generated based on in-the-field and/or over-the-top observations.

Positioning techniques may be characterized and/or assessed based on one or more criteria such as position determination accuracy and/or latency. Latency is a time elapsed between an event that triggers determination of position-related data and the availability of that data at a positioning system interface, e.g., an interface of the LMF 120. At initialization of a positioning system, the latency for the availability of position-related data is called time to first fix (TTFF), and is larger than latencies after the TTFF. An inverse of a time elapsed between two consecutive position-related data availabilities is called an update rate, i.e., the rate at which position-related data are generated after the first fix. Latency may depend on processing capability, e.g., of the UE. For example, a UE may report a processing capability of the UE as a duration of DL PRS symbols in units of time (e.g., milliseconds) that the UE can process every T amount of time (e.g., T ms) assuming 272 PRB (Physical Resource Block) allocation. Other examples of capabilities that may affect latency are a number of TRPs from which the UE can process PRS, a number of PRS that the UE can process, and a bandwidth of the UE.

One or more of many different positioning techniques (also called positioning methods) may be used to determine position of an entity such as one of the UEs 105, 106. For example, known position-determination techniques include RTT, multi-RTT, OTDOA (also called TDOA and including UL-TDOA and DL-TDOA), Enhanced Cell Identification (E-CID), DL-AoD, UL-AoA, etc. RTT uses a time for a signal to travel from one entity to another and back to determine a range between the two entities. The range, plus a known location of a first one of the entities and an angle between the two entities (e.g., an azimuth angle) can be used to determine a location of the second of the entities. In multi-RTT (also called multi-cell RTT), multiple ranges from one entity (e.g., a UE) to other entities (e.g., TRPs) and known locations of the other entities may be used to determine the location of the one entity. In TDOA techniques, the difference in travel times between one entity and other entities may be used to determine relative ranges from the other entities and those, combined with known locations of the other entities may be used to determine the location of the one entity. Angles of arrival and/or departure may be used to help determine location of an entity. For example, an angle of arrival or an angle of departure of a signal combined with a range between devices (determined using signal, e.g., a travel time of the signal, a received power of the signal, etc.) and a known location of one of the devices may be used to determine a location of the other device. The angle of arrival or departure may be an azimuth angle relative to a reference direction such as true north. The angle of arrival or departure may be a zenith angle relative to directly upward from an entity (i.e., relative to radially outward from a center of Earth). E-CID uses the identity of a serving cell, the timing advance (i.e., the difference between receive and transmit times at the UE), estimated timing and power of detected neighbor cell signals, and possibly angle of arrival (e.g., of a signal at the UE from the base station or vice versa) to determine location of the UE. In TDOA, the difference in arrival times at a receiving device of signals from different sources along with known locations of the sources and known offset of transmission times from the sources are used to determine the location of the receiving device.

In a network-centric RTT estimation, the serving base station instructs the UE to scan for/receive RTT measurement signals (e.g., PRS) on serving cells of two or more neighboring base stations (and typically the serving base station, as at least three base stations are needed). The one of more base stations transmit RTT measurement signals on low reuse resources (e.g., resources used by the base station to transmit system information) allocated by the network (e.g., a location server such as the LMF 120). The UE records the arrival time (also referred to as a receive time, a reception time, a time of reception, or a time of arrival (ToA)) of each RTT measurement signal relative to the UE's current downlink timing (e.g., as derived by the UE from a DL signal received from its serving base station), and transmits a common or individual RTT response message (e.g., SRS (sounding reference signal) for positioning, i.e., UL-PRS) to the one or more base stations (e.g., when instructed by its serving base station) and may include the time difference $T_{Rx \rightarrow Tx}$ (i.e., UE $T_{Rx\text{-}Tx}$ or $UE_{Rx\text{-}Tx}$) between the ToA of the RTT measurement signal and the transmission time of the RTT response message in a payload of each RTT response message. The RTT response message would include a reference signal from which the base station can deduce the ToA of the RTT response. By comparing the difference $T_{Tx \rightarrow Rx}$ between the transmission time of the RTT measurement signal from the base station and the ToA of the RTT response at the base station to the UE-reported time difference $T_{Rx \rightarrow Tx}$, the base station can deduce the propagation time between the base station and the UE, from which the base station can determine the distance between the UE and the base station by assuming the speed of light during this propagation time.

A UE-centric RTT estimation is similar to the network-based method, except that the UE transmits uplink RTT measurement signal(s) (e.g., when instructed by a serving base station), which are received by multiple base stations in the neighborhood of the UE. Each involved base station responds with a downlink RTT response message, which may include the time difference between the ToA of the RTT measurement signal at the base station and the transmission time of the RTT response message from the base station in the RTT response message payload.

For both network-centric and UE-centric procedures, the side (network or UE) that performs the RTT calculation typically (though not always) transmits the first message(s) or signal(s) (e.g., RTT measurement signal(s)), while the other side responds with one or more RTT response message(s) or signal(s) that may include the difference between the ToA of the first message(s) or signal(s) and the transmission time of the RTT response message(s) or signal(s).

A multi-RTT technique may be used to determine position. For example, a first entity (e.g., a UE) may send out one or more signals (e.g., unicast, multicast, or broadcast from the base station) and multiple second entities (e.g., other TSPs such as base station(s) and/or UE(s)) may receive a signal from the first entity and respond to this received signal. The first entity receives the responses from the multiple second entities. The first entity (or another entity such as an LMF) may use the responses from the second entities to determine ranges to the second entities and may use the multiple ranges and known locations of the second entities to determine the location of the first entity by trilateration.

In some instances, additional information may be obtained in the form of an angle of arrival (AoA) or angle of departure (AoD) that defines a straight-line direction (e.g., which may be in a horizontal plane or in three dimensions) or possibly a range of directions (e.g., for the UE from the locations of base stations). The intersection of two directions can provide another estimate of the location for the UE.

For positioning techniques using PRS (Positioning Reference Signal) signals (e.g., TDOA and RTT), PRS signals sent by multiple TRPs are measured and the arrival times of the signals, known transmission times, and known locations of the TRPs used to determine ranges from a UE to the TRPs. For example, an RSTD (Reference Signal Time Difference) may be determined for PRS signals received from multiple TRPs and used in a TDOA technique to determine position (location) of the UE. A positioning reference signal may be referred to as a PRS or a PRS signal. The PRS signals are typically sent using the same power and PRS signals with the same signal characteristics (e.g., same frequency shift) may interfere with each other such that a PRS signal from a more distant TRP may be overwhelmed by a PRS signal from a closer TRP such that the signal from the more distant TRP may not be detected. PRS muting may be used to help reduce interference by muting some PRS signals (reducing the power of the PRS signal, e.g., to zero and thus not transmitting the PRS signal). In this way, a weaker (at the UE) PRS signal may be more easily detected by the UE without a stronger PRS signal interfering with the weaker PRS signal. The term RS, and variations thereof (e.g., PRS, SRS), may refer to one reference signal or more than one reference signal.

Positioning reference signals (PRS) include downlink PRS (DL PRS, often referred to simply as PRS) and uplink PRS (UL PRS) (which may be called SRS (Sounding Reference Signal) for positioning). A PRS may comprise a PN code (pseudorandom number code) or be generated using a PN code (e.g., scrambling a PN code with another signal) such that a source of the PRS may serve as a pseudo-satellite (a pseudolite). The PN code may be unique to the PRS source (at least within a specified area such that identical PRS from different PRS sources do not overlap). PRS may comprise PRS resources or PRS resource sets of a frequency layer. A DL PRS positioning frequency layer (or simply a frequency layer) is a collection of DL PRS resource sets, from one or more TRPs, with PRS resource(s) that have common parameters configured by higher-layer parameters DL-PRS-PositioningFrequencyLayer, DL-PRS-ResourceSet, and DL-PRS-Resource. Each frequency layer has a DL PRS subcarrier spacing (SCS) for the DL PRS resource sets and the DL PRS resources in the frequency layer. Each frequency layer has a DL PRS cyclic prefix (CP) for the DL PRS resource sets and the DL PRS resources in the frequency layer. In 5G, a resource block occupies 12 consecutive subcarriers and a specified number of symbols. Also, a DL PRS Point A parameter defines a frequency of a reference resource block (and the lowest subcarrier of the resource block), with DL PRS resources belonging to the same DL PRS resource set having the same Point A and all DL PRS resource sets belonging to the same frequency layer having the same Point A. A frequency layer also has the same DL PRS bandwidth, the same start PRB (and center frequency), and the same value of comb size (i.e., a frequency of PRS resource elements per symbol such that for comb-N, every $N^{th}$ resource element is a PRS resource element). A PRS resource set is identified by a PRS resource set ID and may be associated with a particular TRP (identified by a cell ID) transmitted by an antenna panel of a base station. A PRS resource ID in a PRS resource set may be associated with an omnidirectional signal, and/or with a single beam (and/or beam ID) transmitted from a single base station (where a base station may transmit one or more beams). Each PRS resource of a PRS resource set may be transmitted on a different beam and as such, a PRS resource, or simply resource can also be referred to as a beam. This does not have any implications on whether the base stations and the beams on which PRS are transmitted are known to the UE.

A TRP may be configured, e.g., by instructions received from a server and/or by software in the TRP, to send DL PRS per a schedule. According to the schedule, the TRP may send the DL PRS intermittently, e.g., periodically at a consistent interval from an initial transmission. The TRP may be configured to send one or more PRS resource sets. A resource set is a collection of PRS resources across one TRP, with the resources having the same periodicity, a common muting pattern configuration (if any), and the same repetition factor across slots. Each of the PRS resource sets comprises multiple PRS resources, with each PRS resource comprising multiple Resource Elements (REs) that may be in multiple Resource Blocks (RBs) within N (one or more) consecutive symbol(s) within a slot. An RB is a collection of REs spanning a quantity of one or more consecutive symbols in the time domain and a quantity (12 for a 5G RB) of consecutive sub-carriers in the frequency domain. Each PRS resource is configured with an RE offset, slot offset, a symbol offset within a slot, and a number of consecutive symbols that the PRS resource may occupy within a slot. The RE offset defines the starting RE offset of the first symbol within a DL PRS resource in frequency. The relative RE offsets of the remaining symbols within a DL PRS resource are defined based on the initial offset. The slot offset is the starting slot of the DL PRS resource with respect to a corresponding resource set slot offset. The symbol offset determines the starting symbol of the DL PRS resource within the starting slot. Transmitted REs may repeat across slots, with each transmission being called a repetition such that there may be multiple repetitions in a PRS resource. The DL PRS resources in a DL PRS resource set are associated with the same TRP and each DL PRS resource has a DL PRS resource ID. A DL PRS resource ID in a DL PRS resource set is associated with a single beam transmitted from a single TRP (although a TRP may transmit one or more beams).

A PRS resource may also be defined by quasi-co-location and start PRB parameters. A quasi-co-location (QCL) parameter may define any quasi-co-location information of the DL PRS resource with other reference signals. The DL PRS may be configured to be QCL type D with a DL PRS or SS/PBCH (Synchronization Signal/Physical Broadcast Channel) Block from a serving cell or a non-serving cell. The DL PRS may be configured to be QCL type C with an SS/PBCH Block from a serving cell or a non-serving cell.

The start PRB parameter defines the starting PRB index of the DL PRS resource with respect to reference Point A. The starting PRB index has a granularity of one PRB and may have a minimum value of 0 and a maximum value of 2176 PRBs.

A PRS resource set is a collection of PRS resources with the same periodicity, same muting pattern configuration (if any), and the same repetition factor across slots. Every time all repetitions of all PRS resources of the PRS resource set are configured to be transmitted is referred as an "instance". Therefore, an "instance" of a PRS resource set is a specified number of repetitions for each PRS resource and a specified number of PRS resources within the PRS resource set such that once the specified number of repetitions are transmitted for each of the specified number of PRS resources, the instance is complete. An instance may also be referred to as an "occasion." A DL PRS configuration including a DL PRS transmission schedule may be provided to a UE to facilitate (or even enable) the UE to measure the DL PRS.

Multiple frequency layers of PRS may be aggregated to provide an effective bandwidth that is larger than any of the bandwidths of the layers individually. Multiple frequency layers of component carriers (which may be consecutive and/or separate) and meeting criteria such as being quasi co-located (QCLed), and having the same antenna port, may be stitched to provide a larger effective PRS bandwidth (for DL PRS and UL PRS) resulting in increased time of arrival measurement accuracy. Stitching comprises combining PRS measurements over individual bandwidth fragments into a unified piece such that the stitched PRS may be treated as having been taken from a single measurement. Being QCLed, the different frequency layers behave similarly, enabling stitching of the PRS to yield the larger effective bandwidth. The larger effective bandwidth, which may be referred to as the bandwidth of an aggregated PRS or the frequency bandwidth of an aggregated PRS, provides for better time-domain resolution (e.g., of TDOA). An aggregated PRS includes a collection of PRS resources and each PRS resource of an aggregated PRS may be called a PRS component, and each PRS component may be transmitted on different component carriers, bands, or frequency layers, or on different portions of the same band.

RTT positioning is an active positioning technique in that RTT uses positioning signals sent by TRPs to UEs and by UEs (that are participating in RTT positioning) to TRPs. The TRPs may send DL-PRS signals that are received by the UEs and the UEs may send SRS (Sounding Reference Signal) signals that are received by multiple TRPs. A sounding reference signal may be referred to as an SRS or an SRS signal. In 5G multi-RTT, coordinated positioning may be used with the UE sending a single UL-SRS for positioning that is received by multiple TRPs instead of sending a separate UL-SRS for positioning for each TRP. A TRP that participates in multi-RTT will typically search for UEs that are currently camped on that TRP (served UEs, with the TRP being a serving TRP) and also UEs that are camped on neighboring TRPs (neighbor UEs). Neighbor TRPs may be TRPs of a single BTS (e.g., gNB), or may be a TRP of one BTS and a TRP of a separate BTS. For RTT positioning, including multi-RTT positioning, the DL-PRS signal and the UL-SRS for positioning signal in a PRS/SRS for positioning signal pair used to determine RTT (and thus used to determine range between the UE and the TRP) may occur close in time to each other such that errors due to UE motion and/or UE clock drift and/or TRP clock drift are within acceptable limits. For example, signals in a PRS/SRS for positioning signal pair may be transmitted from the TRP and the UE, respectively, within about 10 ms of each other. With SRS for positioning signals being sent by UEs, and with PRS and SRS for positioning signals being conveyed close in time to each other, it has been found that radio-frequency (RF) signal congestion may result (which may cause excessive noise, etc.) especially if many UEs attempt positioning concurrently and/or that computational congestion may result at the TRPs that are trying to measure many UEs concurrently.

RTT positioning may be UE-based or UE-assisted. In UE-based RTT, the UE 200 determines the RTT and corresponding range to each of the TRPs 300 and the position of the UE 200 based on the ranges to the TRPs 300 and known locations of the TRPs 300. In UE-assisted RTT, the UE 200 measures positioning signals and provides measurement information to the TRP 300, and the TRP 300 determines the RTT and range. The TRP 300 provides ranges to a location server, e.g., the server 400, and the server determines the location of the UE 200, e.g., based on ranges to different TRPs 300. The RTT and/or range may be determined by the TRP 300 that received the signal(s) from the UE 200, by this TRP 300 in combination with one or more other devices, e.g., one or more other TRPs 300 and/or the server 400, or by one or more devices other than the TRP 300 that received the signal(s) from the UE 200.

Various positioning techniques are supported in 5G NR. The NR native positioning methods supported in 5G NR include DL-only positioning methods, UL-only positioning methods, and DL+UL positioning methods. Downlink-based positioning methods include DL-TDOA and DL-AoD. Uplink-based positioning methods include UL-TDOA and UL-AoA. Combined DL+UL-based positioning methods include RTT with one base station and RTT with multiple base stations (multi-RTT).

A position estimate (e.g., for a UE) may be referred to by other names, such as a location estimate, location, position, position fix, fix, or the like. A position estimate may be geodetic and comprise coordinates (e.g., latitude, longitude, and possibly altitude) or may be civic and comprise a street address, postal address, or some other verbal description of a location. A position estimate may further be defined relative to some other known location or defined in absolute terms (e.g., using latitude, longitude, and possibly altitude). A position estimate may include an expected error or uncertainty (e.g., by including an area or volume within which the location is expected to be included with some specified or default level of confidence).

Repetitive Positioning Signal Degradation

PRS configuration parameters provide flexibility for configuring PRS for one or more UEs. PRS configuration parameters include, for example, resource periodicity, stagger pattern (e.g., comb size and offset of REs between symbols), repetition factor, repetition pattern, and muting pattern. A PRS configuration may be shared by multiple UEs or may be UE-specific.

In some situations, repetitive degradation of PRS (uplink and/or downlink) reception may occur. For example, a UE may repetitively move and consequently repetitively have one or more time periods of line of sight (LOS) interleaved with one or more time periods of non-line of sight (NLOS) with a TRP transmitting DL-PRS to the UE and/or receiving UL-PRS from the UE. Also or alternatively, one or more causes of signal degradation other than LOS/NLOS may exist, e.g., interference with one or more other signals (e.g., sent by the TRP, the UE, and/or a device other than the TRP or the UE).

Figure 5:
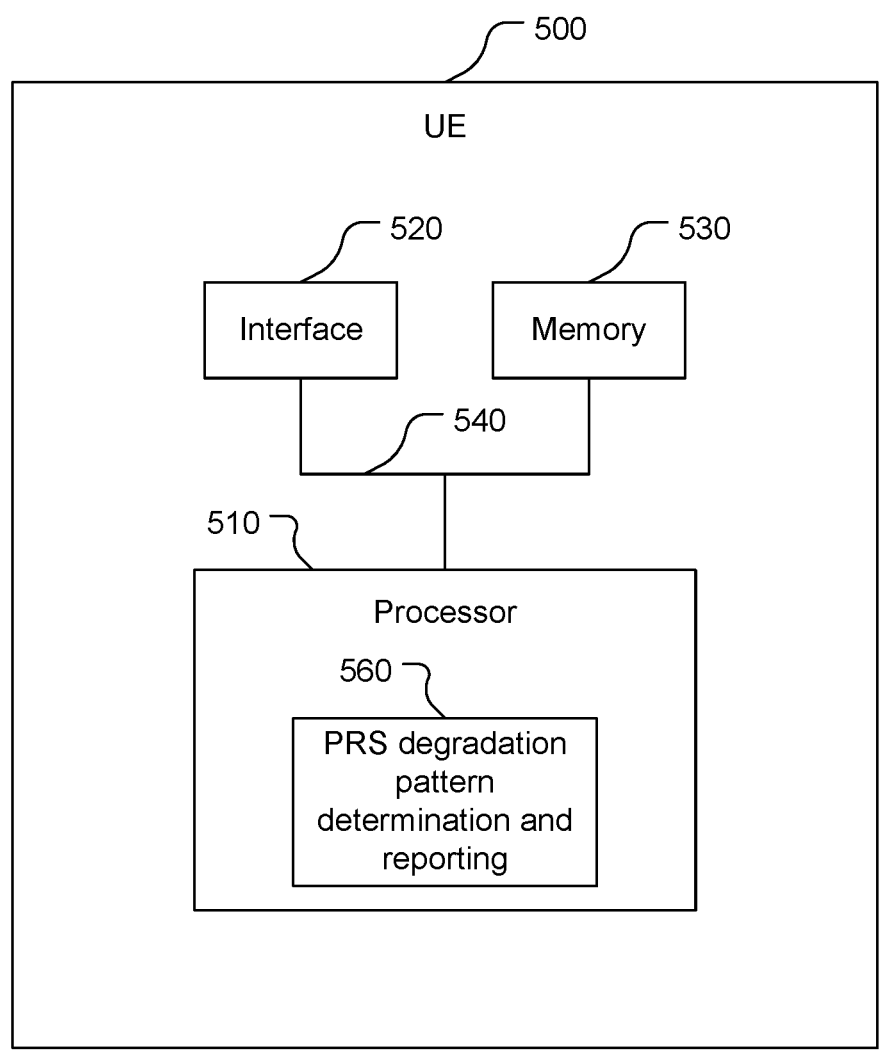
FIG. 5 is a simplified block diagram of an example user equipment.

Referring to FIG. 5, with further reference to FIGS. 1-4, a UE 500 includes a processor 510, an interface 520, and a memory 530 communicatively coupled to each other by a bus 540. The UE 500 may include some or all of the components shown in FIG. 5, and may include one or more other components such as any of those shown in FIG. 2 such that the UE 200 may be an example of the UE 500. The processor 510 may include one or more components of the processor 210. The interface 520 may include one or more of the components of the transceiver 215, e.g., the wireless transmitter 242 and the antenna 246, or the wireless receiver 244 and the antenna 246, or the wireless transmitter 242, the wireless receiver 244, and the antenna 246. Also or alternatively, the interface 520 may include the wired transmitter 252 and/or the wired receiver 254. The interface 520 may include the SPS receiver 217 and the antenna 262. The memory 530 may be configured similarly to the memory 211, e.g., including software with processor-readable instructions configured to cause the processor 510 to perform functions.

The description herein may refer only to the processor 510 performing a function, but this includes other implementations such as where the processor 510 executes software (stored in the memory 530) and/or firmware. The description herein may refer to the UE 500 performing a function as shorthand for one or more appropriate components (e.g., the processor 510 and the memory 530) of the UE 500 performing the function. The processor 510 (possibly in conjunction with the memory 530 and, as appropriate, the interface 520) includes a PRS degradation pattern determination and reporting unit 560, referred to herein as the PRS DPDR unit 560. The PRS DPDR unit 560 may be configured to perform one or more functions for receiving and/or transmitting positioning reference signals (DL-PRS and/or UL-PRS and/or sidelink PRS (SL-PRS) (although the discussion herein focuses on DL-PRS and UL-PRS)), obtaining measurements of positioning reference signals, determining a pattern of PRS degradation, reporting measurements of PRS, and/or reporting a determined pattern of PRS degradation. The term PRS may refer to one or more positioning reference signals and may apply, as appropriate, to UL-PRS or DL-PRS or SL-PRS.

Figure 6:
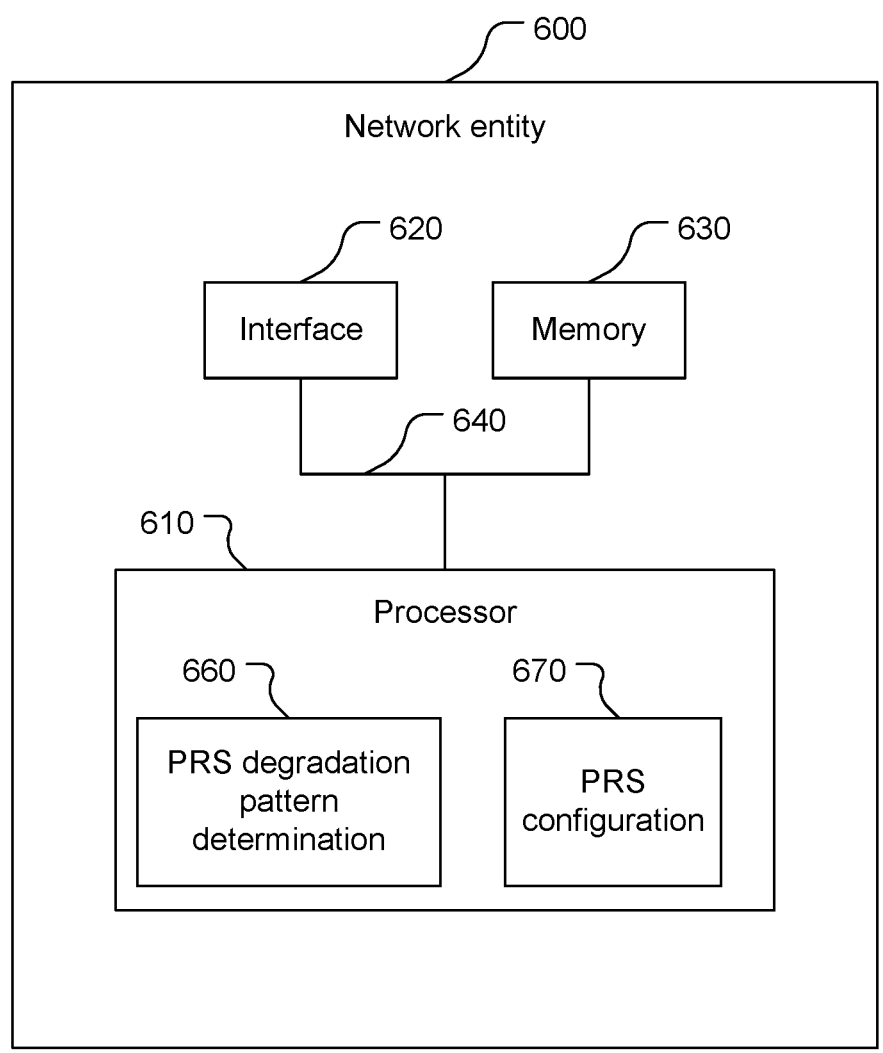
FIG. 6 is a simplified block diagram of an example network entity.

Referring to FIG. 6, with further reference to FIGS. 1-5, a network entity 600, which may be an example of the TRP 300 shown in FIG. 3, an example of the server 400 (e.g., an LMF) shown in FIG. 4, or a combination thereof, includes a processor 610, an interface 620, and a memory 630 communicatively coupled to each other by a bus 640. The network entity 600 may include some or all of the components shown in FIG. 6, and may include one or more other components such as any of those shown in FIG. 3 and/or FIG. 4. The interface 620 may include one or more of the components of the transceiver 315 and/or the transceiver 415 (e.g., the wired transceiver 350, 450 and/or the wireless transceiver 340, 440). The memory 630 may be configured similarly to the memory 311 and/or the memory 411, e.g., including software with processor-readable instructions configured to cause the processor 610 to perform functions.

The description herein may refer only to the processor 610 performing a function, but this includes other implementations such as where the processor 610 executes software (stored in the memory 630) and/or firmware. The description herein may refer to the network entity 600 performing a function as shorthand for one or more appropriate components (e.g., the processor 610 and the memory 630) of the network entity 600 performing the function. The processor 610 (possibly in conjunction with the memory 630 and, as appropriate, the interface 620) includes a PRS degradation pattern determination unit 660, referred to herein as the PRS DPD unit 660, and a PRS configuration unit 670. The PRS degradation pattern determination unit 660 may be configured to perform one or more functions for receiving and/or transmitting positioning reference signals (UL-PRS and/or DL-PRS), measuring positioning reference signals, and determining a pattern of PRS degradation. The PRS configuration unit 670 may be configured to perform one or more functions for determining (including re-determining) one or more PRS parameters and/or PRS features, and sending PRS in accordance with the determined PRS configuration and/or causing PRS to be sent by another device in accordance with the determined PRS configuration. For example, if the network entity 600 is an example of the server 400 only, then the PRS configuration unit 670 may be configured to send features for a PRS configuration to the TRP 300 for the TRP 300 to implement in a PRS configuration, or communicate with the TRP 300 to agree with the TRP 300 to a PRS configuration. As another example, if the network entity 600 includes the TRP 300, then the PRS configuration unit 670 may be configured to determine the PRS configuration (possibly in accordance with PRS features received from the server 400), to implement the PRS configuration (e.g., by sending DL-PRS in accordance with the PRS configuration), and to send the PRS configuration to the UE 500 to schedule PRS reception and/or transmission at the UE 500.

Figure 7:
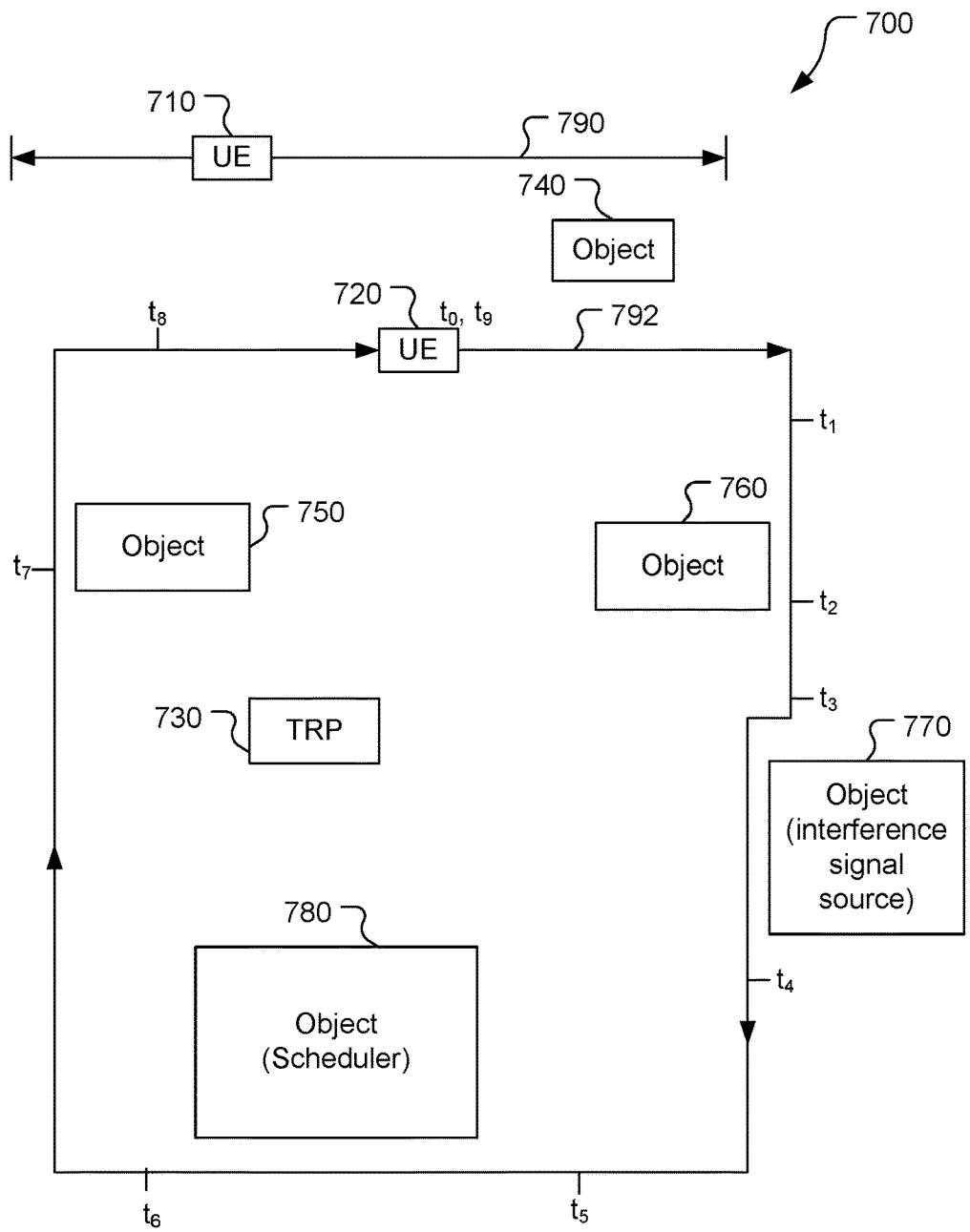
FIG. 7 is a simplified diagram of an example environment with repetitive positioning reference signal reception degradation.
Figure 8:
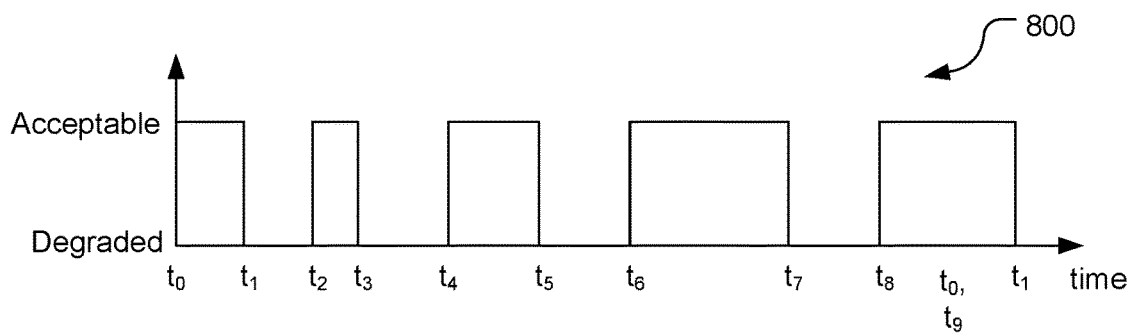
FIG. 8 is a timing diagram of positioning signal reception quality in the environment shown in FIG. 7.

Referring to FIGS. 7 and 8, with further reference to FIGS. 1-6, an example environment 700 has repetitive PRS signal degradation from which a PRS pattern 800 may be determined. The environment 700 is an Industrial Internet of Things (IIoT) environment, and is an example of an environment having repetitive PRS signal degradation and is not limiting of the disclosure. Numerous other environments are possible. In the environment 700, a UE 710 and a UE 720, which are both examples of the UE 500, have repetitive motion. The UE 710 moves back and forth along a line 790 and the UE 720 moves in a loop 792. The UEs 710, 720 are configured to send and/or receive PRS to and/or from a TRP 730, which is an example of the TRP 300. As the UE 720 moves around the loop, the UE 720 alternates between areas of acceptable PRS and degraded PRS. In the areas of acceptable PRS, DL-PRS sent from the TRP 730 is received by the UE 720 with acceptable quality (e.g., RSRP (Reference Signal Received Power) above a threshold) and/or UL-PRS sent from the UE 720 is received by the TRP 730 with acceptable quality. In the areas of degraded PRS, DL-PRS sent from the TRP 730 is received by the UE 720 with unacceptable quality (e.g., RSRP (Reference Signal Received Power) below the threshold) and/or UL-PRS sent from the UE 720 is received by the TRP 730 with unacceptable quality. While it is possible that areas of acceptable and degraded (unacceptable) DL-PRS reception quality may differ from areas of acceptable and degraded UL-PRS reception quality, for simplicity of the discussion, the areas of acceptable and degraded PRS are assumed to be the same for uplink and downlink. In the example shown, the UE 720 travels the loop 792 in a time $t_9$, with objects 750, 760, 780 being disposed between the UE 720 and the TRP 730 rendering NLOS conditions between times $t_1$ and $t_2$, between times $t_5$ and $t_6$, and between times $t_7$ and $t_8$, respectively. Another object 770 is not disposed between the UE 720 and the TRP 730, but degrades PRS exchange between the UE 720 and the TRP 730 between times $t_3$ and $t_4$, due to signal interference between the PRS and one or more signals transmitted by the object 770. The combined degradation due to the objects 750, 760, 770, 780 yields a PRS pattern 800 (of repetitive degradation). Similarly, the PRS exchanged between the UE 710 and the TRP 730 may be repetitively degraded due to an object 740 and the object 750, although a PRS pattern for the UE 710 is not shown.

The PRS DPDR unit 560 and/or the PRS DPD unit 660 may determine the acceptable or degraded status of PRS for determining the PRS pattern 800. For example, the PRS DPDR unit 560 may use one or more explicit measurements (e.g., made by a PRS unit of the processor 510) and/or one or more implicit indications to determine acceptable or degraded status of PRS. For example, the PRS DPDR unit 560 may obtain one or more measurements of received DL-PRS and/or may receive one or more indications of measured UL-PRS from the TRP 730, and analyze the PRS measurement(s) to determine acceptable and degraded PRS reception. The PRS measurement(s) may include, for example, SNR (signal-to-noise ratio), SINR (signal-and-interference-to-noise ratio), RSRP, a confidence level, etc. Also or alternatively, the PRS DPDR unit 560 may be configured to make an LOS/NLOS determination based on one or more measurements (e.g., one or more images taken by the camera and analyzed by the processor 510) and determine that the PRS is(are) degraded if the UE is NLOS relative to the TRP 730. Also or alternatively, the PRS DPDR unit 560 may be configured to use an LPP warning/error message that is indicative of poor measurement quality. As another example, the PRS DPDR unit 560 may be able to use a relative location of the UEs 720, 710 to help determine PRS degradation, e.g., LOS/NLOS relative to the TRP 730. The PRS DPDR unit 560 may, for example, use the relative location of the UEs 720, 710, the location of the UE 710, and the locations of the objects 750, 760, 780 to determine LOS/NLOS of the UE 720. As another example, the PRS DPDR unit 560 may use a trajectory of the UE 720 (speed and direction) of the UE 720 to determine PRS degradation. For example, the PRS DPDR unit 560 may use the past trajectory of the UE 720, the present time, and locations of the objects 750, 760, 780 to determine LOS/NLOS status. Also or alternatively, the PRS DPDR unit 560 may be configured to determine that the UE 720 and another UE are using the same transmission (Tx) beam from the TRP 730 and thus may be aligned. The UE 720, if further from the TRP 730, may thus be obscured from the TRP 730. As another example, a scheduler (in this example, being (part of) the object 780) may schedule, or at least have knowledge of, movement of entities within the environment 700. The scheduler may provide a message indicating scheduled movement within the environment 700 and the PRS DPDR unit 560 may use the scheduled movement information, along with knowledge of the location of the TRP 730, to determine PRS degradation, e.g., LOS/NLOS of the UE 720 and the TRP 730.

The PRS DPDR unit 560 may be configured to analyze one or more of the explicit measurements and/or one or more of the implicit indications, combining multiple measurement(s)/indication(s) per an algorithm, to determine whether the PRS at any given time is acceptable or degraded. For example, the PRS DPDR unit 560 may implement artificial intelligence, using an algorithm that has been trained with locations of the UE 720 as inputs and corresponding signal qualities as outputs (e.g., acceptable/unacceptable (degraded) classifications), and/or trained with times from a reference time (e.g., $t_0$ corresponding to the UE 720 being at the location of the UE 720 shown in FIG. 7) as inputs and signal quality as outputs. The PRS DPDR unit 560 may use present location and/or time in a cycle of the loop 792 as an input to predict whether the PRS is acceptable/unacceptable(degraded). Similarly, the PRS DPD unit 660 may be configured to determine the acceptable or degraded status of PRS by obtaining and analyzing one or more explicit measurements and/or one or more implicit pieces of information regarding PRS signal quality. For example, the PRS DPD unit 660 may be configured to measure received UL-PRS and/or receive one or more indications of measured DL-PRS from the UE 720, and analyze one or more these measurements and/or one or more of the other explicit measurements discussed above and/or one or more of the implicit indications discussed above to determine or predict acceptable and degraded PRS status.

The PRS DPDR unit 560 and/or the PRS DPD unit 660 may be configured to determine the PRS pattern 800. The PRS pattern 800 is indicative of repetitive acceptable and degraded PRS reception. Thus, the PRS DPDR unit 560 and/or the PRS DPD unit 660 may be configured to use determinations of acceptable/degraded status of PRS over time to determine a repetitive nature of the acceptable/degraded status of PRS to determine the pattern 800 (or any other PRS status pattern, the pattern 800 being one example pattern for illustration purposes). The PRS DPDR unit 560 may be configured to apply one or more machine-learning algorithms, e.g., a neural network, to the raw information from which the acceptable/degraded PRS status is determined and/or to the determined acceptable/degraded PRS status for time spanning multiple repetitions of the pattern 800 to determine the pattern 800. For example, the raw information (e.g., location, time from a reference time, etc.) may be stored in a history log of raw information and along with the corresponding acceptable/degraded status may be used as training data for the algorithm. The PRS DPDR unit 560 may be configured to use machine learning, e.g., a neural network, to correct the pattern 800 (e.g., to suggest one or more modifications, e.g., to a path of the UE 500, to alter the pattern 800). Also or alternatively, the PRS DPD unit 660 may be configured to apply one or more machine-learning algorithms, e.g., a neural network, to the measured PRS to determine the pattern 800. The UE 500 and/or the network entity 600 may also or alternatively provide information (e.g., crowdsource the information) regarding the pattern 800 (e.g., the pattern, measurement(s) from which the pattern 800 is derived, etc.) to one or more other entities that may implement a neural network. The information may be used by the entity(ies) to improve one or more neural networks, e.g., by training and/or fine-tuning the neural network(s) with the provided information.

The PRS configuration unit 670 may be configured to reconfigure the PRS configuration based on the PRS pattern 800 of PRS acceptable/degraded status. For example, the PRS configuration unit 670 may determine one or more PRS parameters such as periodicity, offset, muting pattern, comb size, stagger, etc. based on the pattern 800 in order to reduce use of degraded PRS in determining position information (e.g., pseudorange(s), position estimate(s), RSRP, etc.) for the UE 500. For example, the PRS configuration unit 670 may determine one or more PRS configuration parameters to help avoid transmission and/or measurement of PRS during periods that will yield degraded PRS reception. Using degraded PRS may reduce accuracy of position information, e.g., by including multipath signals that yield inaccurate pseudoranges or other position information (e.g., RSRP, etc.). Thus, by eliminating use of one or more degraded PRS, position information accuracy may be improved.

The PRS DPDR unit 560 and/or the PRS DPD unit 660 may be configured to determine a PRS muting pattern based on the PRS pattern 800 of PRS acceptable/degraded status. A PRS configuration may include a PRS muting pattern. The PRS DPDR unit 560 and/or the PRS DPD unit 660 may determine a new muting pattern in view of the pattern 800. If the PRS DPDR unit 560 determines the new muting pattern, the PRS DPDR unit 560 may send a message to the network entity 600 to recommend the new muting pattern to the network entity 600. PRS muting patterns may be of various configurations and/or at various levels of granularity. For example, a PRS muting pattern may be based on time (e.g., with ON (no muting) times and OFF (muting) times), and/or may be inter-occasion, intra-occasion, inter-slot, intra-slot, at a frame level, at a sub-frame level, at a multi-symbol level, or a single-symbol level, etc. For these examples, the PRS muting pattern may be a binary bit sequence of indications of whether or not to mute each occasion, each portion of an occasion, each slot, each portion of a slot, each group of symbols, or each symbol. For example, a logical one (1) may indicate not to mute the corresponding information and a logical zero (0) may indicate to mute (not transmit) the corresponding information. The PRS pattern 800 may be represented by a binary bit sequence (which may be referred to as a bit sequence) with each bit indicating (e.g., by a logical zero) to mute PRS during the corresponding time period or indicating (e.g., by a logical one) not to change a scheduled muting of PRS during the corresponding time period.

Figure 9:
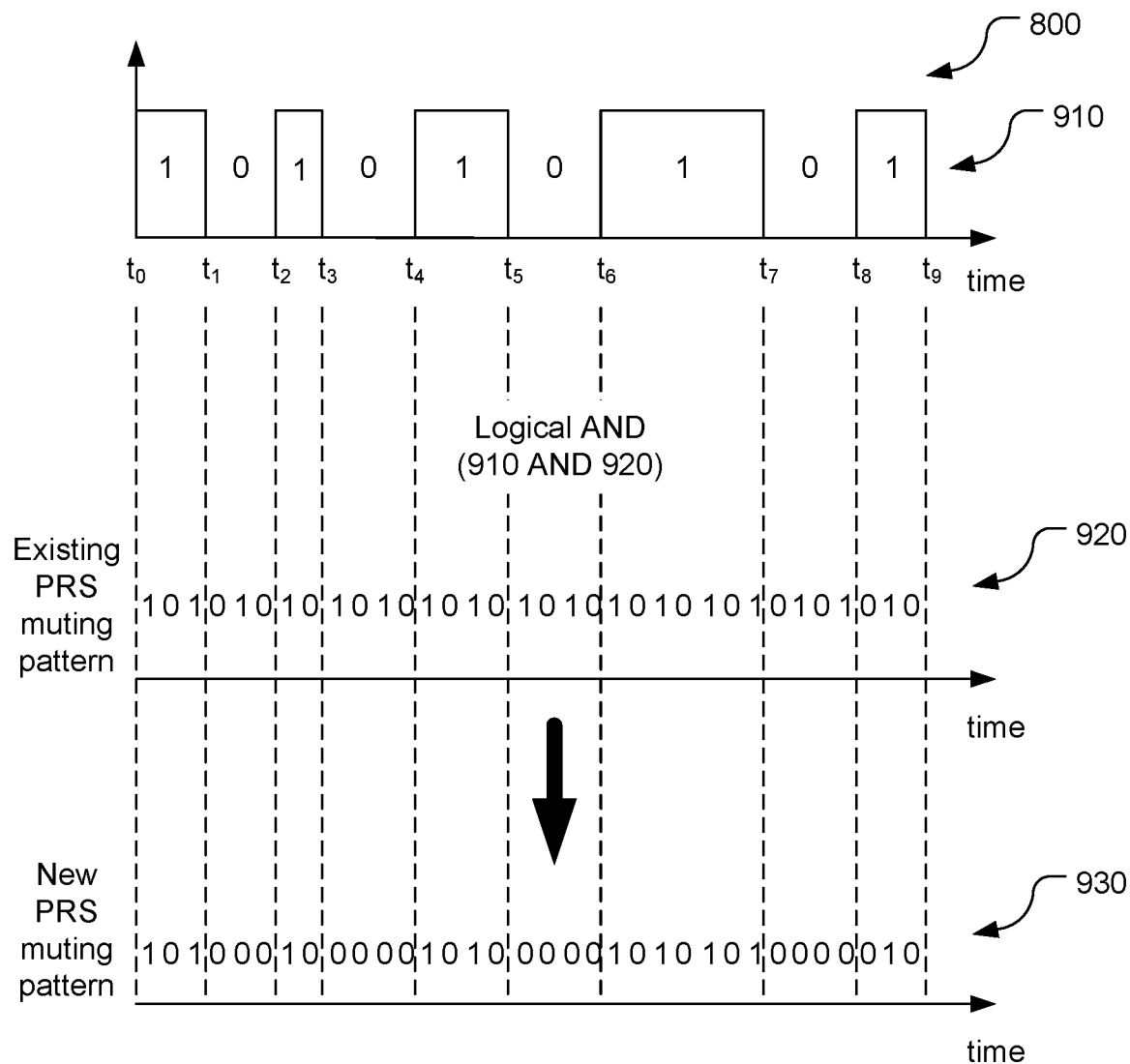
FIG. 9 is an illustration of a logical combination of a bit sequence of a pattern of positioning signal reception quality shown in FIG. 8 with an existing positioning signal muting pattern bit sequence.

Referring also to FIG. 9, the new muting pattern may be determined using the PRS pattern 800 and an existing muting pattern, if any. If there is no existing PRS muting pattern, then the PRS pattern 800 (of repetitive degradation) may be used as the new muting pattern. If a PRS muting pattern already exists, then the new muting pattern may be determined, for example, by logically combining a bit sequence representing the existing PRS muting pattern and a bit sequence representing the PRS pattern 800 (as determined by the PRS DPDR unit 560 and/or the PRS DPD unit 660 or obtained by the PRS DPDR unit 560 from the PRS DPD unit 660 or vice versa). For example, as shown in FIG. 9, a bit sequence 910 for the PRS pattern 800 can be combined with a logical AND operation with a bit sequence 920 of an existing PRS muting pattern (where a bit value of "1" indicates no muting and a bit value of "0" indicates muting) to yield a new bit sequence 930 corresponding to the new PRS muting pattern. The PRS DPDR unit 560 may determine the new bit sequence 930 and/or may send an indication of the PRS pattern 800, e.g., the bit sequence 910, to the PRS DPD unit 660 from which the new muting pattern may be determined. Similarly, the PRS DPD unit 660 may determine the new muting pattern (based on the current muting pattern and signal degradation pattern), e.g., the new bit sequence 930, and send the new muting pattern to the UE 500 for the UE 500 to replace the existing muting pattern with the new muting pattern. Also or alternatively, the PRS DPD unit 660 may send, to the UE 500, an indication (e.g., the bit sequence 910) of the PRS pattern 800 (that the network entity 600 determined or otherwise obtained (e.g., received from the UE 500 or another UE)) and the UE 500 may determine the new muting pattern (e.g., the new bit sequence 930) using the bit sequence 920 (of the existing muting pattern) and the bit sequence 910 (of the PRS pattern) that the UE 500 received from the network entity 600 (or determined). The bit sequences 910, 920, 930 are examples used for illustrative purposes only and other bit sequences are possible. For example, the bit sequence 920 of the existing muting pattern may be much more detailed (e.g., at the occasion, slot, or even symbol level) given potentially long time periods associated with the bit sequence 910. The new bit sequence 930 effectively shows which portions of the existing muting pattern not to transmit (i.e., that should be skipped).

Referring again in particular to FIGS. 6 and 8, with further reference to FIGS. 1-5 and 7, the PRS DPD unit 660 may be configured not to send one or more DL-PRS and/or not to measure one or more UL-PRS. For example, the PRS DPD unit 660 may determine that a new PRS degradation exists or will occur that is not reflected in the PRS pattern 800 and/or accounted for in the existing PRS configuration. The PRS DPD unit 660 may respond to this determination by selectively muting a DL-PRS and/or selectively not measuring a UL-PRS. This may be transparent to the UE 500 and may be a temporary solution during a positioning procedure in response to a new PRS degradation that is discovered but the PRS configuration has not yet been updated, e.g., because a new PRS pattern has not been established and thus the PRS configuration not having been reconfigured yet. Indeed, the new PRS degradation may not be a recurring degradation and thus the PRS pattern 800 may not be changed, but use of the non-repetitive PRS degradation avoided, which may improve the accuracy of the positioning procedure.

Referring again in particular to FIGS. 5 and 8, with further reference to FIGS. 1-4, 6, and 7, the PRS DPDR unit 560 may be configured to send link condition information for determining PRS degradation and/or to send a report of the PRS pattern 800. For example, the PRS DPDR unit 560 may be configured to send a report of one or more link conditions (e.g., one or more direct measurements) to the network entity 600. The report may contain indications of degraded PRS, e.g., instead of including measurements of acceptable PRS but not measurements of degraded PRS. Also or alternatively, the report may include an information element (IE)/message to indicate that a certain link has degraded PRS reception, e.g., is NLOS. As another example, the PRS DPDR unit 560 may be configured to send a report of the PRS pattern 800 indicating a repetitive pattern of acceptable and degraded PRS. The PRS DPDR unit 560 may be configured to report the PRS pattern 800 in a variety of manners. For example, the PRS DPDR unit 560 may be configured to report the PRS pattern 800 in terms of PRS parameters such as periodicity, offset, ON time, OFF time, comb size, stagger, etc., e.g., with the ON and/or OFF times defined in terms of numbers of slots, subframes, and/or frames, etc. As another example, the PRS DPDR unit 560 may be configured to report the PRS pattern 800 in terms of a bit sequence such as the bit sequence 910. The bit sequence of the PRS pattern 800 may, however, be provided with a different granularity than the PRS, e.g., a bit for each slot, subframe, frame, PRS occasion, etc.

The PRS pattern 800 of acceptable and degraded PRS may change over time.

For example, one or more objects may be moved, removed, and/or introduced into the environment 700, and/or a movement pattern of the UE 720 may be changed, and/or the signaling of the object 770 may change, and/or the object 770 may be removed or signaling ceased, and/or one or more other objects producing signals may be introduced, etc. Consequently, deviations from a PRS configuration based on the PRS pattern 800 may be implemented to explore whether one or more changes in repetitive PRS degradation have occurred. For example, PRS may be sent on demand (e.g., periodically, semi-persistently, and/or aperiodically) regardless of the PRS pattern 800. The on-demand PRS may be different PRS than PRS for which the muting pattern is applicable. Measurement of such on-demand PRS with unacceptable quality or lack of measurement of such PRS may indicate that the degradation that resulted in the pattern 800 still exists, different degradation warranting the pattern 800 exists. Measurement of such PRS with acceptable quality may indicate that PRS reception at the time of the on-demand, aperiodic, or semi-persistent PRS and/or at the location of the measuring device is now acceptable. The device determining repetitive PRS degradation, e.g., the PRS DPDR unit 560 and/or the PRS DPD unit 660, may change the PRS pattern 800 based on a change from degraded to acceptable PRS reception performance for at least a threshold amount of time and/or a threshold number of occurrences. The PRS DPDR unit 560 and/or the PRS DPD unit 660 may re-determine a PRS pattern of acceptable PRS and PRS degradation and re-determine a corresponding muting pattern as appropriate. As another example of deviating from the muting pattern that is determined based on the PRS pattern 800 for exploration of a different PRS pattern, an activate/deactivate message can be transmitted to/from the UE 500 from/to the network entity 600 indicating to activate or deactivate the muting pattern based on the PRS pattern 800. For example, the network entity 600 may send the activate/deactivate message to the UE 500 to cause the UE 500 to temporarily deactivate the PRS muting pattern, e.g., corresponding to the bit sequence 910, and/or the PRS muting pattern corresponding to the new bit sequence 930 such that PRS that would be muted if the bit sequence 910, 930 was active will be transmitted and measured. The activate/deactivate message and/or another message may indicate specific PRS to be measured and measurements of the PRS reported, including for on-demand and/or semi-persistent PRS. For example, there may be a limited quantity of PRS measurements that can be reported. Thus, a report message may indicate one or more PRS measurements to be included in a PRS measurement report, such that if any PRS measurements are culled from inclusion in the PRS measurement report, the culled PRS measurements will not include the specified PRS measurement(s). The PRS measurements may include link measurements and/or link quality measurements.

Figure 10:
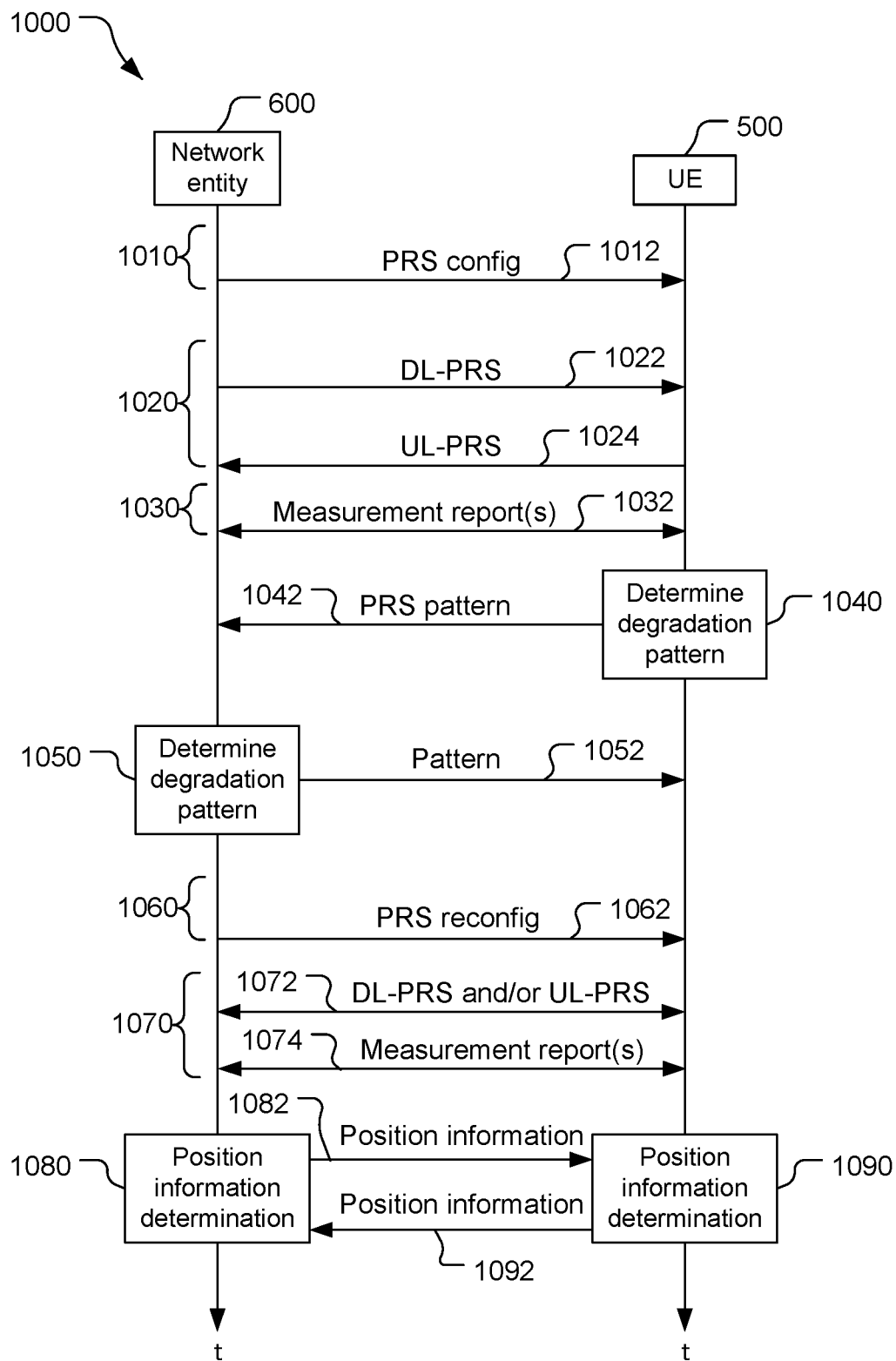
FIG. 10 is a simplified example processing and signal flow for determining position information.

Referring to FIG. 10, with further reference to FIGS. 1-9, a processing and signal flow 1000 for determining position information includes the stages shown. The flow 1000 is an example, and stages may be added to, removed from, and/or rearranged in the flow 1000. At stage 1010, the network entity 600 may send a PRS configuration message 1012 to the UE 500 with PRS configuration information (e.g., offset, periodicity, repetition factor, muting pattern, comb size, stagger, etc.). At stage 1020, the network entity 600 and the UE 500 may exchange PRS in one or more DL-PRS messages 1022 and/or one or more UL-PRS messages 1024 in accordance with the PRS configuration indicated in the PRS configuration message 1012. At stage 1030, the network entity 600 and the UE 500 exchange one or more measurement report(s) 1032 (i.e., the UE 500 may send one or more measurement reports to the network entity 600 and/or the network entity 600 may send one or more measurement reports to the UE 500). At stage 1040, which is optional, the UE 500 may determine repetitive PRS reception degradation, if any, may determine a PRS pattern corresponding to repetitive PRS reception degradation, and may send a PRS pattern message 1042 to the network entity 600 indicating the PRS pattern, e.g., the PRS pattern 800. The PRS pattern message 1042 may include a recommendation for a PRS muting pattern based on the PRS degradation pattern. At stage 1050, which is optional, the network entity 600 may determine repetitive PRS reception degradation, if any, may determine a PRS pattern corresponding to repetitive PRS reception degradation, and may send a PRS pattern message 1052 to the UE 500 indicating the PRS pattern, e.g., the PRS pattern 800. The network entity 600 may determine the degradation pattern using observation/measurement by the network entity 600, including a degradation pattern (if any) reported by the UE 500 in the PRS pattern message 1042. At stage 1040 and/or stage 1050, one or more pieces of information (e.g., explicit measurement(s) and/or implicit information) may be used to determine the PRS degradation pattern as discussed above (e.g., using machine learning). At stage 1060, the network entity 600 determines and sends a PRS reconfiguration message 1062 to the UE 500 with reconfigured PRS configuration (e.g., one or more new PRS configuration parameters such as periodicity, offset, repetition factor, muting pattern, comb size, stagger, etc.). At stage 1070, the network entity 600 and the UE 500 may exchange one or more PRS messages 1072 and/or one or more measurement reports 1074, e.g., similar to stages 1020, 1030, using the reconfigured PRS configuration. At stages 1080, 1090 the network entity 600 and/or the UE 500 may determine position information (e.g., pseudorange(s), measurement(s), position estimate(s) for the UE 500, etc.) and may exchange one or more position information messages 1082, 1092. The flow 1000 may return to stage 1020, and deviations from the reconfigured muting pattern may be implemented for link condition exploration, e.g., in response to an on-demand, aperiodic, or semi-persistent PRS, or in response to a suspension of the PRS muting pattern based on PRS degradation.

Operation

Figure 11:
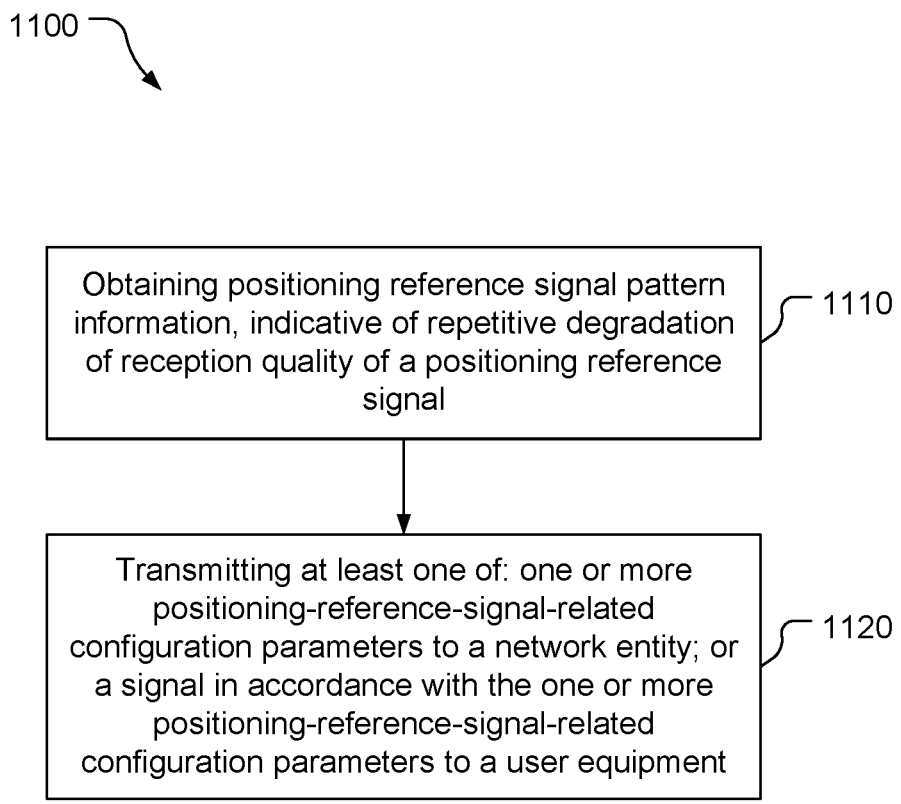
FIG. 11 is a block flow diagram of a method of determining one or more positioning-reference-signal-related configuration parameters.

Referring to FIG. 11, with further reference to FIGS. 1-10, a method 1100, at an apparatus, of adapting to repetitive positioning reference signal reception degradation includes the stages shown. The method 1100 is, however, an example only and not limiting. The method 1100 may be altered, e.g., by having stages added, removed, rearranged, combined, performed concurrently, and/or having single stages split into multiple stages.

At stage 1110, the method 1100 includes obtaining positioning reference signal pattern information, indicative of repetitive degradation of reception quality of a positioning reference signal. Obtaining the positioning reference signal pattern information may comprise at least one of receiving the positioning reference signal pattern information from a UE, receiving the positioning reference signal pattern information from a network entity, or determining the positioning reference signal pattern information from a plurality of measurements of the positioning reference signal. For example, the UE 500 (e.g., the PRS DPDR unit 560) and/or the network entity 600 (e.g., the PRS DPD unit 660) may obtain one or more measurements of one or more PRS made over time to determine repetitive degradation of PRS reception quality (e.g., using one or more machine-learning algorithms, e.g., in one or more neural networks). Also or alternatively, the UE 500 may receive one or more indications of PRS reception quality from the network entity 600 (or another UE) and/or the network entity 600 may receive one or more indications of PRS reception quality from the UE 500 (or another network entity). Also or alternatively, the UE 500 and/or the network entity 600 may obtain one or more other explicit measurements and/or one or more implicit indications of PRS reception quality. The UE 500 and/or the network entity 600 may analyze the explicit measurement(s) and/or the implicit indication(s) to determine positioning reference signal pattern information indicative of repetitive degradation of PRS reception quality (e.g., using machine learning). Also or alternatively, the UE 500 may receive one or more indications of a positioning signal pattern from the network entity 600 and/or the network entity 600 may receive one or more indications of a positioning signal pattern from the UE 500. The processor 510, possibly in combination with the memory 530, in combination with the interface 520 (e.g., the wireless receiver 244 and the antenna 246) may comprise means for obtaining positioning reference signal pattern information. Also or alternatively, the processor 610, possibly in combination with the memory 630, in combination with the interface 620 (e.g., a wireless receiver and an antenna) may comprise means for obtaining positioning reference signal pattern information.

At stage 1120, the method 1100 includes transmitting at least one of: one or more positioning-reference-signal-related configuration parameters to a network entity; or a signal in accordance with the one or more positioning-reference-signal-related configuration parameters to a user equipment. The network entity may be a network entity from which the positioning reference signal pattern information is received, or may be distinct from such a network entity. For example, the PRS configuration unit 670 may send the positioning-reference-signal-related configuration parameter(s), e.g., the PRS pattern message 1052, via the interface 620 to a TRP, if the network entity is a server, e.g., an LMF, or may send a PRS configuration (e.g., the PRS pattern message 1052) and/or a signal (e.g., a DL PRS) to the UE 500 if the network entity 600 is a TRP. The processor 610 (e.g., the processor 410 or the processor 310), possibly in combination with the memory 630 (e.g., the memory 411 or the memory 311), in combination with the interface 620 (e.g., the transceiver 415 or the transceiver 315), may comprise means for transmitting the one or more positioning-reference-signal-related configuration parameters to another network entity and/or a signal in accordance with the one or more altered parameters to a UE. As another example, the PRS DPDR unit 560 may send the positioning-reference-signal-related configuration parameter(s), e.g., the PRS pattern message 1042, via the interface 520 to a TRP or a UE (e.g., for sidelink positioning) or may send a signal (e.g., a UL PRS to the TRP 300 or an SL PRS to another UE 500) in accordance with the altered parameter(s). The processor 510, possibly in combination with the memory 530, in combination with the interface 520 (e.g., the wireless transmitter 242 and the antenna 246) may comprise means for transmitting one or more positioning-reference-signal-related configuration parameters to a network entity and/or a signal in accordance with the positioning-reference-signal-related configuration parameter(s) to a UE.

Implementations of the method 1100 may include one or more of the following features. In an example implementation, the method 1100 may include: determining a positioning reference signal muting pattern based on the positioning reference signal pattern information; and transmitting an indication of the positioning reference signal muting pattern to the user equipment. For example, the PRS DPD unit 660 may determine a PRS muting pattern based on the PRS pattern 800, and send an indication of the configuration of the PRS muting pattern to the UE 500 via the interface 620. The muting pattern may be the pattern implemented by the TRP 300, or may be a pattern to be used to derive the muting pattern used by the TRP 300, e.g., may be a degradation bit sequence to be combined (e.g., logically) with a bit sequence of an existing muting pattern to determine a new muting pattern. The determined muting pattern may be an positioning-reference-signal-related configuration parameter of the one or more positioning-reference-signal-related configuration parameters. The processor 610, possibly in combination with the memory 630, may comprise means for determining the PRS muting pattern and the processor 610, possibly in combination with the memory 630, in combination with the interface 620, may comprise means for transmitting an indication of the PRS muting pattern to the UE. In a further example implementation, the indication of the positioning reference signal muting pattern indicates one or more positioning reference signals to be repetitively muted. For example, a downlink muting pattern may indicate one or more downlink positioning reference signals to be repetitively muted by the UE. In another example, an uplink muting pattern may indicate one or more uplink positioning reference signals to be repetitively muted by the UE. In another further example implementation, the method 1100 may include transmitting a deactivation message to the UE indicating a deactivation of the positioning reference signal muting pattern. For example, the PRS configuration unit 670 may (produce as appropriate and) send a message to the UE 500 informing the UE 500 that a PRS muting pattern based on repetitive degraded PRS reception is being deactivated, e.g., allowing exploration of whether previously-degraded PRS are presently degraded and thus whether the present muting pattern should be changed. The processor 610, possibly in combination with the memory 630, in combination with the interface 620 (e.g., a wireless transmitter and an antenna), may comprise means for transmitting a deactivation message. The deactivation message may indicate one or more PRS measurements for the UE to report to the first network entity. In another further example implementation, the method 1100 may include transmitting, to the UE, an aperiodic, on-demand, and/or semi-persistent positioning reference signal independently of the positioning reference signal muting pattern. For example, the PRS configuration unit 670 may (produce as appropriate and) send an aperiodic, on-demand, or semi-persistent PRS that would be muted under a present muting pattern, e.g., allowing exploration of whether previously-degraded PRS are presently degraded and thus whether the present muting pattern should be changed. A deactivation message may be used in conjunction with the aperiodic, on-demand, and/or semi-persistent transmission of the PRS. The processor 610, possibly in combination with the memory 630, in combination with the interface 620 (e.g., a wireless transmitter and an antenna), may comprise means for transmitting at least one of an aperiodic, on-demand, or semi-persistent PRS. In another further example implementation, the indication of the positioning reference signal muting pattern may comprise a binary bit sequence wherein each bit in the binary bit sequence indicates a relative degradation and corresponds to a respective amount of time of scheduled positioning reference signal transmission. For example, the PRS DPD unit 660 may determine a bit sequence, such as the bit sequence 910, with each bit indicating to mute or not to mute and corresponding to a respective time period corresponding to respective times of acceptable PRS and degraded PRS in the PRS pattern 800.

Also or alternatively, implementations of the method 1100 may include one or more of the following features. In an example implementation, the method 1100 may include predicting signal degradation of a particular positioning reference signal scheduled to be transmitted without muting; and responding to predicting the future PRS degradation by at least one of: muting the particular PRS; or avoiding measurement of the particular PRS. For example, the network entity 600 may determine that a PRS that is scheduled to be transmitted and not muted will have degraded reception quality and may use this information to determine to mute the PRS or not to measure the PRS (e.g., a UL-PRS). The network entity 600 may use one or more machine-learning algorithms, e.g., as a neural network, to predict the signal degradation. For example, one or more algorithms may be trained with actual UE movement as inputs and signal degradation results. To the algorithm(s), scheduled UE movement may be provided as an input to obtain predicted signal degradation as an output. Also or alternatively, the network entity 600 and/or the UE 500 may provide information, e.g., measurements of PRS, to an entity that implements a neural network to predict the signal degradation of the particular scheduled PRS. The processor 510, possibly in combination with the memory 530, may comprise means for predicting signal degradation. Also or alternatively, the processor 610, possibly in combination with the memory 630, may comprise means for predicting signal degradation. To mute the PRS, the network entity 600 may mute, or cause to be muted, a DL-PRS scheduled to be transmitted by the network entity (e.g., a TRP 300) or a UL-PRS scheduled to be transmitted by the UE 500. To cause another entity to mute the PRS, the network entity may send the entity to mute the PRS an instruction message to mute a specified PRS. The processor 610, possibly in combination with the memory 630, possibly in combination with the interface 620 (e.g., the wireless transmitter 342 and the antenna 346) may comprise means for muting the particular PRS. To avoid measurement of the particular PRS, the UE 500 may not acquire one or more signal samples or may ignore one or more signal samples so that one or more corresponding measurements are not obtained. The processor 510, possibly in combination with the memory 530, may comprise means for avoiding measurement of the particular PRS. In another example implementation, the one or more scheduled positioning-reference-signal-related configuration parameters may comprise at least one of a positioning reference signal periodicity, offset, comb size, or repetition factor.

Also or alternatively, implementations of the method 1100 may include one r more of the following features. In an example implementation, the method 1100 includes altering one or more scheduled positioning-reference-signal-related configuration parameters, based on the positioning reference signal pattern information, to the one or more positioning-reference-signal-related configuration parameters. For example, the network entity 600 (e.g., the PRS configuration unit 670) (and/or the UE 500) may change an existing value of a PRS configuration characteristic (e.g., periodicity, offset, repetition factor, muting pattern, etc.) of a scheduled PRS to a different value. The PRS configuration characteristic(s) (e.g., muting pattern) may be applicable to multiple UEs or may be specific to a particular UE. The processor 610, possibly in combination with the memory 630 (or the processor 510, possibly in combination with the memory 530), may comprise means for altering one or more scheduled PRS configuration characteristics.

Figure 12:
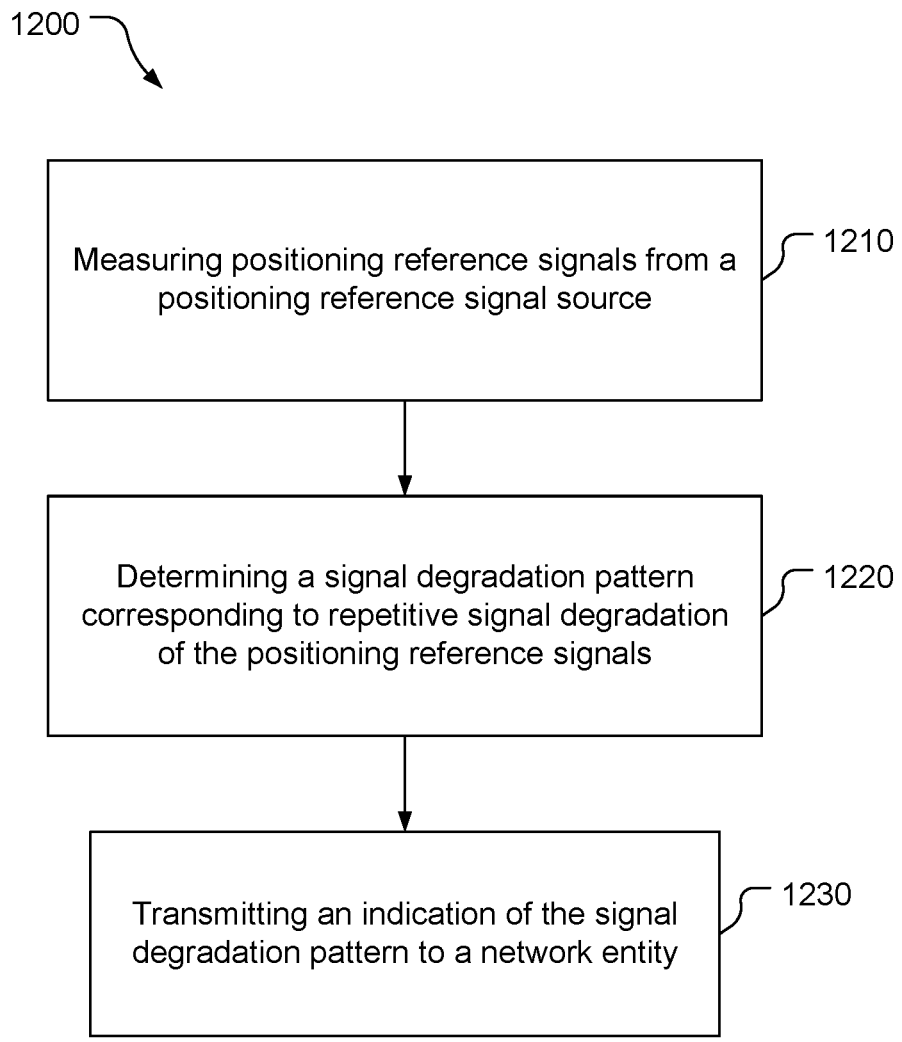
FIG. 12 is a block flow diagram of a method of providing an indication of signal degradation.

Referring to FIG. 12, with further reference to FIGS. 1-11, a method 1200 of providing an indication of signal degradation includes the stages shown. The method 1200 is, however, an example only and not limiting. The method 1200 may be altered, e.g., by having stages added, removed, rearranged, combined, performed concurrently, and/or having single stages split into multiple stages.

At stage 1210, the method 1200 includes obtaining measurements of positioning reference signals received from a positioning reference signal source. For example, the PRS DPDR unit 560 may obtain measurements from a PRS unit (e.g., a portion of the processor 510) that measures PRS sent from the TRP 300. The PRS DPDR unit 560 may be part of the PRS unit, or may be separate from the PRS unit. The PRS DPDR unit 560 may obtain and/or analyze the PRS measurements in response to detection of an inconsistency (e.g., a change in signal strength, quality, etc. more than a threshold and/or a signal measurement value (e.g., signal strength, quality, etc.) below a threshold value). The processor 510, possibly in combination with the memory 530, in combination with the interface 520 (e.g., the wireless receiver 244 and the antenna 246) may comprise means for measuring PRS.

At stage 1220, the method 1200 includes determining a signal degradation pattern corresponding to repetitive signal degradation of the positioning reference signals. For example, the PRS DPDR unit 560 may analyze multiple PRS measurements and/or one or more other explicit measurements and/or one or more implicit indications to determine a pattern of PRS degradation over time (a pattern of degraded PRS reception), e.g., using a machine-learning algorithm. The processor 510, possibly in combination with the memory 530 and/or in combination with the interface 520 (e.g., the wireless receiver 244 and the antenna 246), may comprise means for determining a signal degradation pattern. A signal degradation pattern does not mean or require a pattern of increasing degradation.

At stage 1230, the method 1200 includes transmitting an indication of the signal degradation pattern to a network entity. For example, the UE 500 may send parameters of the pattern, e.g., time periods corresponding to acceptable and degraded PRS, or a bit sequence indicating acceptable and degraded PRS and corresponding time periods, or a bit sequence indicating a recommended muting pattern corresponding to the signal degradation pattern, etc. The processor 510, possibly in combination with the memory 530 and/or in combination with the interface 520 (e.g., the wireless receiver 244 and the antenna 246), may comprise means for transmitting an indication of the signal degradation pattern.

Implementations of the method 1200 may include one or more of the following features. For example, the indication of the signal degradation pattern may comprise one or more positioning reference signal timing parameters. The timing parameters may be time periods, or moments in time, and may be sent with corresponding PRS reception quality indications and/or muting recommendations, etc. In another example implementation, the indication of the signal degradation pattern comprises a binary bit sequence wherein each bit in the binary bit sequence indicates a relative degradation and corresponds to a respective amount of time of scheduled positioning reference signal transmission. The binary bit sequence may have a variety of levels of granularity, e.g., slot level, subframe level, frame level, occasion level, etc.

Other Considerations

Other examples and implementations are within the scope of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations.

As used herein, the singular forms "a," "an," and "the" include the plural forms as well, unless the context clearly indicates otherwise. The terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

As used herein, unless otherwise stated, a statement that a function or operation is "based on" an item or condition means that the function or operation is based on the stated item or condition and may be based on one or more items and/or conditions in addition to the stated item or condition.

Also, as used herein, "or" as used in a list of items prefaced by "at least one of" or prefaced by "one or more of" indicates a disjunctive list such that, for example, a list of "at least one of A, B, or C," or a list of "one or more of A, B, or C" means A, or B, or C, or AB (A and B), or AC (A and C), or BC (B and C), or ABC (i.e., A and B and C), or combinations with more than one feature (e.g., AA, AAB, ABBC, etc.). Thus, a recitation that an item, e.g., a processor, is configured to perform a function regarding at least one of A or B means that the item may be configured to perform the function regarding A, or may be configured to perform the function regarding B, or may be configured to perform the function regarding A and B. For example, a phrase of "a processor configured to measure at least one of A or B" means that the processor may be configured to measure A (and may or may not be configured to measure B), or may be configured to measure B (and may or may not be configured to measure A), or may be configured to measure A and measure B (and may be configured to select which, or both, of A and B to measure). Similarly, a recitation of a means for measuring at least one of A or B includes means for measuring A (which may or may not be able to measure B), or means for measuring B (and may or may not be configured to measure A), or means for measuring A and B (which may be able to select which, or both, of A and B to measure). As another example, a recitation that an item, e.g., a processor, is configured to at least one of perform function X or perform function Y means that the item may be configured to perform the function X, or may be configured to perform the function Y, or may be configured to perform the function X and to perform the function Y. For example, a phrase of "a processor configured to at least one of measure X or measure Y" means that the processor may be configured to measure X (and may or may not be configured to measure Y), or may be configured to measure Y (and may or may not be configured to measure X), or may be configured to measure X and to measure Y (and may be configured to select which, or both, of X and Y to measure).

Substantial variations may be made in accordance with specific requirements. For example, customized hardware might also be used, and/or particular elements might be implemented in hardware, software (including portable software, such as applets, etc.) executed by a processor, or both. Further, connection to other computing devices such as network input/output devices may be employed. Components, functional or otherwise, shown in the figures and/or discussed herein as being connected or communicating with each other are communicatively coupled unless otherwise noted. That is, they may be directly or indirectly connected to enable communication between them.

The systems and devices discussed above are examples. Various configurations may omit, substitute, or add various procedures or components as appropriate. For instance, features described with respect to certain configurations may be combined in various other configurations. Different aspects and elements of the configurations may be combined in a similar manner. Also, technology evolves and, thus, many of the elements are examples and do not limit the scope of the disclosure or claims.

A wireless communication system is one in which communications are conveyed wirelessly, i.e., by electromagnetic and/or acoustic waves propagating through atmospheric space rather than through a wire or other physical connection. A wireless communication network may not have all communications transmitted wirelessly, but is configured to have at least some communications transmitted wirelessly. Further, the term "wireless communication device," or similar term, does not require that the functionality of the device is exclusively, or evenly primarily, for communication, or that the device be a mobile device, but indicates that the device includes wireless communication capability (one-way or two-way), e.g., includes at least one radio (each radio being part of a transmitter, receiver, or transceiver) for wireless communication.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations provides a description for implementing described techniques. Various changes may be made in the function and arrangement of elements.

The terms "processor-readable medium," "machine-readable medium," and "computer-readable medium," as used herein, refer to any medium that participates in providing data that causes a machine to operate in a specific fashion. Using a computing platform, various processor-readable media might be involved in providing instructions/code to processor(s) for execution and/or might be used to store and/or carry such instructions/code (e.g., as signals). In many implementations, a processor-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

Having described several example configurations, various modifications, alternative constructions, and equivalents may be used. For example, the above elements may be components of a larger system, wherein other rules may take precedence over or otherwise modify the application of the invention. Also, a number of operations may be undertaken before, during, or after the above elements are considered. Accordingly, the above description does not bound the scope of the claims.

A statement that a value exceeds (or is more than or above) a first threshold value is equivalent to a statement that the value meets or exceeds a second threshold value that is slightly greater than the first threshold value, e.g., the second threshold value being one value higher than the first threshold value in the resolution of a computing system. A statement that a value is less than (or is within or below) a first threshold value is equivalent to a statement that the value is less than or equal to a second threshold value that is slightly lower than the first threshold value, e.g., the second threshold value being one value lower than the first threshold value in the resolution of a computing system.

The invention claimed is:

1. An apparatus comprising:
   an interface configured to transfer wireless signals between the apparatus and a user equipment;
   a memory; and
   a processor, communicatively coupled to the interface and the memory, configured to:
      obtain positioning reference signal pattern information indicative of a repetitive pattern, corresponding to positioning reference signal transfer between the apparatus and another entity, of acceptable positioning reference signal reception quality and degradation of positioning reference signal reception quality, the degradation including loss of line of sight between the apparatus and the other entity, or interference with the at least one positioning reference signal, or a combination thereof, wherein the repetitive pattern comprises alternating occurrences, as a function of at least one of location or time, of acceptable positioning reference signal reception quality and degraded positioning reference signal reception quality; and
      transmit, via the interface and based on the positioning reference signal pattern information, at least one of: to a network entity, one or more positioning-reference-signal-related configuration parameters; or, to the user equipment, a signal in accordance with the one or more positioning-reference-signal-related configuration parameters.

2. The apparatus of claim 1, wherein the processor is configured to determine a positioning reference signal muting pattern based on the positioning reference signal pattern information and to transmit an indication of the positioning reference signal muting pattern via the interface to the user equipment.

3. The apparatus of claim 2, wherein the indication of the positioning reference signal muting pattern indicates one or more positioning reference signals to be repetitively muted.

4. The apparatus of claim 2, wherein the processor is configured to transmit a deactivation message via the interface to the user equipment indicating a deactivation of the positioning reference signal muting pattern.

5. The apparatus of claim 4, wherein the deactivation message includes an indication of at least one positioning reference signal measurement for the user equipment to report to the apparatus.

6. The apparatus of claim 2, wherein the processor is configured to transmit, to the user equipment, at least one of an aperiodic, on-demand, or semi-persistent positioning reference signal independently of the positioning reference signal muting pattern.

7. The apparatus of claim 2, wherein the indication of the positioning reference signal muting pattern comprises a binary bit sequence wherein each bit in the binary bit sequence indicates a relative degradation and corresponds to a respective amount of time of scheduled positioning reference signal transmission.

8. The apparatus of claim 1, wherein the processor is configured to:
   predict signal degradation of a particular positioning reference signal scheduled to be transmitted without muting; and
   in response to predicting the signal degradation of the particular positioning reference signal, at least one of:
   mute the particular positioning reference signal; or
   avoid measurement of the particular positioning reference signal.

9. The apparatus of claim 1, wherein the one or more scheduled positioning-reference-signal-related configuration parameters comprise at least one of a positioning reference signal periodicity, offset, comb size, muting pattern, or repetition factor.

10. An apparatus comprising:
    means for obtaining positioning reference signal pattern information indicative of a repetitive pattern, corresponding to positioning reference signal transfer between the apparatus and another entity, of acceptable positioning reference signal reception quality and degradation of positioning reference signal reception quality, the degradation including loss of line of sight between the apparatus and the other entity, or interference with the at least one positioning reference signal, or a combination thereof, wherein the repetitive pattern comprises alternating occurrences, as a function of at least one of location or time, of acceptable positioning reference signal reception quality and degraded positioning reference signal reception quality; and
    first means for transmitting, based on the positioning reference signal pattern information, at least one of: to a network entity, one or more positioning-reference-signal-related configuration parameters; or, to a user equipment, a signal in accordance with the one or more positioning-reference-signal-related configuration parameters.

11. The apparatus of claim 10, further comprising:
    means for determining a positioning reference signal muting pattern based on the positioning reference signal pattern information; and
    second means for transmitting an indication of the positioning reference signal muting pattern to the user equipment.

12. The apparatus of claim 11, wherein the indication of the positioning reference signal muting pattern indicates one or more positioning reference signals to be repetitively muted.

13. The apparatus of claim 11, further comprising third means for transmitting a deactivation message to the user equipment indicating a deactivation of the positioning reference signal muting pattern.

14. The apparatus of claim 13, wherein the deactivation message includes an indication of at least one positioning reference signal measurement for the user equipment to report to the apparatus.

15. The apparatus of claim 11, further comprising fourth means for transmitting, to the user equipment, at least one of an aperiodic, on-demand, or semi-persistent positioning reference signal independently of the positioning reference signal muting pattern.

16. The apparatus of claim 11, wherein the indication of the positioning reference signal muting pattern comprises a binary bit sequence wherein each bit in the binary bit sequence indicates a relative degradation and corresponds to a respective amount of time of scheduled positioning reference signal transmission.

17. The apparatus of claim 10, further comprising:
    predicting means, the predicting means for predicting signal degradation of a particular positioning reference signal scheduled to be transmitted without muting; and
    means for responding to the predicting means predicting the signal degradation of the particular positioning reference signal by at least one of:

muting the particular positioning reference signal; or
avoiding measurement of the particular positioning reference signal.

18. The apparatus of claim 10, wherein the one or more scheduled positioning-reference-signal-related configuration parameters comprise at least one of a positioning reference signal periodicity, offset, comb size, or repetition factor.

19. A method, at an apparatus, of adapting to repetitive positioning reference signal reception degradation, the method comprising:
obtaining positioning reference signal pattern information indicative of a repetitive pattern, corresponding to positioning reference signal transfer between the apparatus and another entity, of acceptable positioning reference signal reception quality and degradation of positioning reference signal reception quality, the degradation including loss of line of sight between the apparatus and the other entity, or interference with the at least one positioning reference signal, or a combination thereof, wherein the repetitive pattern comprises alternating occurrences, as a function of at least one of location or time, of acceptable positioning reference signal reception quality and degraded positioning reference signal reception quality; and
transmitting, based on the positioning reference signal pattern information, at least one of: to a network entity, one or more positioning-reference-signal-related configuration parameters; or, to a user equipment, a signal in accordance with the one or more positioning-reference-signal-related configuration parameters.

20. The method of claim 19, further comprising:
determining a positioning reference signal muting pattern based on the positioning reference signal pattern information; and
transmitting an indication of the positioning reference signal muting pattern to the user equipment.

21. The method of claim 20, wherein the indication of the positioning reference signal muting pattern indicates one or more positioning reference signals to be repetitively muted.

22. The method of claim 20, further comprising transmitting a deactivation message to the user equipment indicating a deactivation of the positioning reference signal muting pattern.

23. The method of claim 22, wherein the deactivation message includes an indication of at least one positioning reference signal measurement for the user equipment to report to the apparatus.

24. The method of claim 20, further comprising transmitting, to the user equipment, at least one of an aperiodic, on-demand, or semi-persistent positioning reference signal independently of the positioning reference signal muting pattern.

25. The method of claim 20, wherein the indication of the positioning reference signal muting pattern comprises a binary bit sequence wherein each bit in the binary bit sequence indicates a relative degradation and corresponds to a respective amount of time of scheduled positioning reference signal transmission.

26. The method of claim 19, further comprising:
predicting signal degradation of a particular positioning reference signal scheduled to be transmitted without muting; and
responding to predicting the signal degradation of the particular positioning reference signal by at least one of:
muting the particular positioning reference signal; or
avoiding measurement of the particular positioning reference signal.

27. The method of claim 19, wherein the one or more scheduled positioning-reference-signal-related configuration parameters comprise at least one of a positioning reference signal periodicity, offset, comb size, or repetition factor.

28. A non-transitory, processor-readable storage medium comprising processor-readable instructions configured to cause a processor of an apparatus, in order to adapt to repetitive positioning reference signal reception degradation, to:
obtain positioning reference signal pattern information indicative of a repetitive pattern, corresponding to positioning reference signal transfer between the apparatus and another entity, of acceptable positioning reference signal reception quality and degradation of positioning reference signal reception quality, the degradation including loss of line of sight between the apparatus and the other entity, or interference with the at least one positioning reference signal, or a combination thereof, wherein the repetitive pattern comprises alternating occurrences, as a function of at least one of location or time, of acceptable positioning reference signal reception quality and degraded positioning reference signal reception quality; and
transmit, based on the positioning reference signal pattern information, at least one of: to a network entity, one or more positioning-reference-signal-related configuration parameters; or, to a user equipment, a signal in accordance with the one or more positioning-reference-signal-related configuration parameters.

29. The storage medium of claim 28, further comprising instructions configured to cause the processor to:
determine a positioning reference signal muting pattern based on the positioning reference signal pattern information; and
transmit an indication of the positioning reference signal muting pattern to the user equipment.

30. The storage medium of claim 29, wherein the indication of the positioning reference signal muting pattern indicates one or more positioning reference signals to be repetitively muted.

31. The storage medium of claim 29, further comprising instructions configured to cause the processor to transmit a deactivation message to the user equipment indicating a deactivation of the positioning reference signal muting pattern.

32. The storage medium of claim 31, wherein the deactivation message includes an indication of at least one positioning reference signal measurement for the user equipment to report to the apparatus.

33. The storage medium of claim 29, further comprising instructions configured to cause the processor to transmit, to the user equipment, at least one of an aperiodic, on-demand, or semi-persistent positioning reference signal independently of the positioning reference signal muting pattern.

34. The storage medium of claim 29, wherein the indication of the positioning reference signal muting pattern comprises a binary bit sequence wherein each bit in the binary bit sequence indicates a relative degradation and corresponds to a respective amount of time of scheduled positioning reference signal transmission.

35. The storage medium of claim 28, further comprising instructions configured to cause the processor to:
predict signal degradation of a particular positioning reference signal scheduled to be transmitted without muting; and
respond to predicting the signal degradation of the particular positioning reference signal by at least one of:
muting the particular positioning reference signal; or
avoiding measurement of the particular positioning reference signal.

36. The storage medium of claim 28, wherein the one or more scheduled positioning-reference-signal-related configuration parameters comprise at least one of a positioning reference signal periodicity, offset, comb size, or repetition factor.

37. A user equipment comprising:
a transceiver configured to transmit and receive wireless signals;
a memory; and
a processor, communicatively coupled to the transceiver and the memory, and configured to:
measure at least one positioning reference signal received via the transceiver;
determine a signal degradation pattern indicative of a repetitive pattern of acceptable positioning reference signal reception quality of the at least one positioning reference signal and degradation of positioning reference signal reception quality of the at least one positioning reference signal, the degradation including loss of line of sight between the user equipment and a source of the at least one positioning reference signal, or interference with the at least one positioning reference signal, or a combination thereof, wherein the repetitive pattern comprises alternating occurrences, as a function of at least one of location or time, of acceptable positioning reference signal reception quality and degraded positioning reference signal reception quality; and
transmit, via the transceiver, an indication of the signal degradation pattern.

38. The user equipment of claim 37, wherein the indication of the signal degradation pattern comprises one or more positioning reference signal timing parameters.

39. The user equipment of claim 37, wherein the indication of the signal degradation pattern comprises a binary bit sequence wherein each bit in the binary bit sequence indicates a relative degradation and corresponds to a respective amount of time of scheduled positioning reference signal transmission.

40. A user equipment comprising:
means for measuring at least one positioning reference signal from a positioning reference signal source;
means for determining a signal degradation pattern indicative of a repetitive pattern of acceptable positioning reference signal reception quality of the at least one positioning reference signal and degradation of positioning reference signal reception quality of the at least one positioning reference signal, the degradation including loss of line of sight between the user equipment and a source of the at least one positioning reference signal, or interference with the at least one positioning reference signal, or a combination thereof, wherein the repetitive pattern comprises alternating occurrences, as a function of at least one of location or time, of acceptable positioning reference signal reception quality and degraded positioning reference signal reception quality; and
means for transmitting an indication of the signal degradation pattern to a network entity.

41. The user equipment of claim 40, wherein the indication of the signal degradation pattern comprises one or more positioning reference signal timing parameters.

42. The user equipment of claim 40, wherein the indication of the signal degradation pattern comprises a binary bit sequence wherein each bit in the binary bit sequence indicates a relative degradation and corresponds to a respective amount of time of scheduled positioning reference signal transmission.

43. A method of providing an indication of signal degradation, the method comprising:
measuring, at a user equipment, at least one positioning reference signal from a positioning reference signal source;
determining, at the user equipment, a signal degradation pattern indicative of a repetitive pattern of acceptable positioning reference signal reception quality of the at least one positioning reference signal and degradation of positioning reference signal reception quality of the at least one positioning reference signal, the degradation including loss of line of sight between the user equipment and a source of the at least one positioning reference signal, or interference with the at least one positioning reference signal, or a combination thereof, wherein the repetitive pattern comprises alternating occurrences, as a function of at least one of location or time, of acceptable positioning reference signal reception quality and degraded positioning reference signal reception quality; and
transmitting, from the user equipment, an indication of the signal degradation pattern to a network entity.

44. The method of claim 43, wherein the indication of the signal degradation pattern comprises one or more positioning reference signal timing parameters.

45. The method of claim 43, wherein the indication of the signal degradation pattern comprises a binary bit sequence wherein each bit in the binary bit sequence indicates a relative degradation and corresponds to a respective amount of time of scheduled positioning reference signal transmission.

46. A non-transitory, processor-readable storage medium comprising processor-readable instructions configured to cause a processor of a user equipment, in order to provide an indication of signal degradation, to:
measure at least one positioning reference signals from a positioning reference signal source;
determine a signal degradation pattern indicative of a repetitive pattern of acceptable reception quality of the at least one positioning reference signal and degradation of reception quality of the at least one positioning reference signal, the degradation including loss of line of sight between the user equipment and the positioning reference signal source, or interference with the at least one positioning reference signal, or a combination thereof, wherein the repetitive pattern comprises alternating occurrences, as a function of at least one of location or time, of acceptable reception quality and degraded reception quality; and
transmit an indication of the signal degradation pattern to a network entity.

47. The storage medium of claim 46, wherein the indication of the signal degradation pattern comprises one or more positioning reference signal timing parameters.

48. The storage medium of claim 46, wherein the indication of the signal degradation pattern comprises a binary bit sequence wherein each bit in the binary bit sequence indicates a relative degradation and corresponds to a respective amount of time of scheduled positioning reference signal transmission.

* * * * *